United States Patent [19]

Mastandrea

[11] Patent Number: 4,852,054
[45] Date of Patent: Jul. 25, 1989

[54] VOLUMETRIC LEAK DETECTION SYSTEM FOR UNDERGROUND STORAGE TANKS AND THE LIKE

[75] Inventor: John R. Mastandrea, Rancho Palos Verdes, Calif.

[73] Assignee: NDE Technology, Inc., Torrance, Calif.

[21] Appl. No.: 122,284

[22] Filed: Nov. 18, 1987

Related U.S. Application Data

[63] Continuation-in-part of Ser. No. 933,472, Nov. 20, 1986, abandoned.

[51] Int. Cl.$^4$ .................. G01M 3/38; G01F 23/10
[52] U.S. Cl. .................... 364/509; 364/550; 364/556; 73/40; 73/49.1; 73/49.2; 73/149; 340/605
[58] Field of Search ........ 364/150, 151, 497, 507–509, 364/550–551, 556, 571, 580; 73/1 H, 4 R, 40, 49.1–49.3, 49.5, 52, 149; 340/605

[56] References Cited

U.S. PATENT DOCUMENTS

| | | | |
|---|---|---|---|
| 4,353,245 | 10/1982 | Nicolai | 340/605 X |
| 4,571,987 | 2/1986 | Horner | 73/49.2 |
| 4,604,893 | 8/1986 | Senese et al. | 73/49.2 |
| 4,630,467 | 12/1986 | Senese et al. | 73/293 X |
| 4,646,560 | 3/1987 | Maresca, Jr. et al. | 73/299 X |
| 4,649,739 | 3/1987 | Horner | 73/49.2 |
| 4,672,842 | 6/1987 | Hasselmann | 73/49.2 |
| 4,736,329 | 4/1988 | Ferretti et al. | 364/509 |
| 4,736,623 | 4/1988 | Brown et al. | 340/605 X |
| 4,740,777 | 4/1988 | Slocum et al. | 340/605 X |

FOREIGN PATENT DOCUMENTS

0202133 9/1986 Japan .................. 73/49.2 T

Primary Examiner—Parshotam S. Lall
Assistant Examiner—Joseph L. Dixon
Attorney, Agent, or Firm—Owen, Wickersham & Erickson

[57] ABSTRACT

Method and apparatus for detecting leaks in underground tanks containing a liquid. The pressure and temperature of the liquid are measured over a predetermining time interval, while simultaneously measuring the liquid level in the tank and the temperature of the liquid therein. From each measuring step the leak rate of the liquid from the tank is calculated and the two calculated leak rates are compared with each other. The temperature at a series of different depths in the tank is measured. Other measurements are made and fed to a suitable computer which computes the leakage rate.

92 Claims, 19 Drawing Sheets

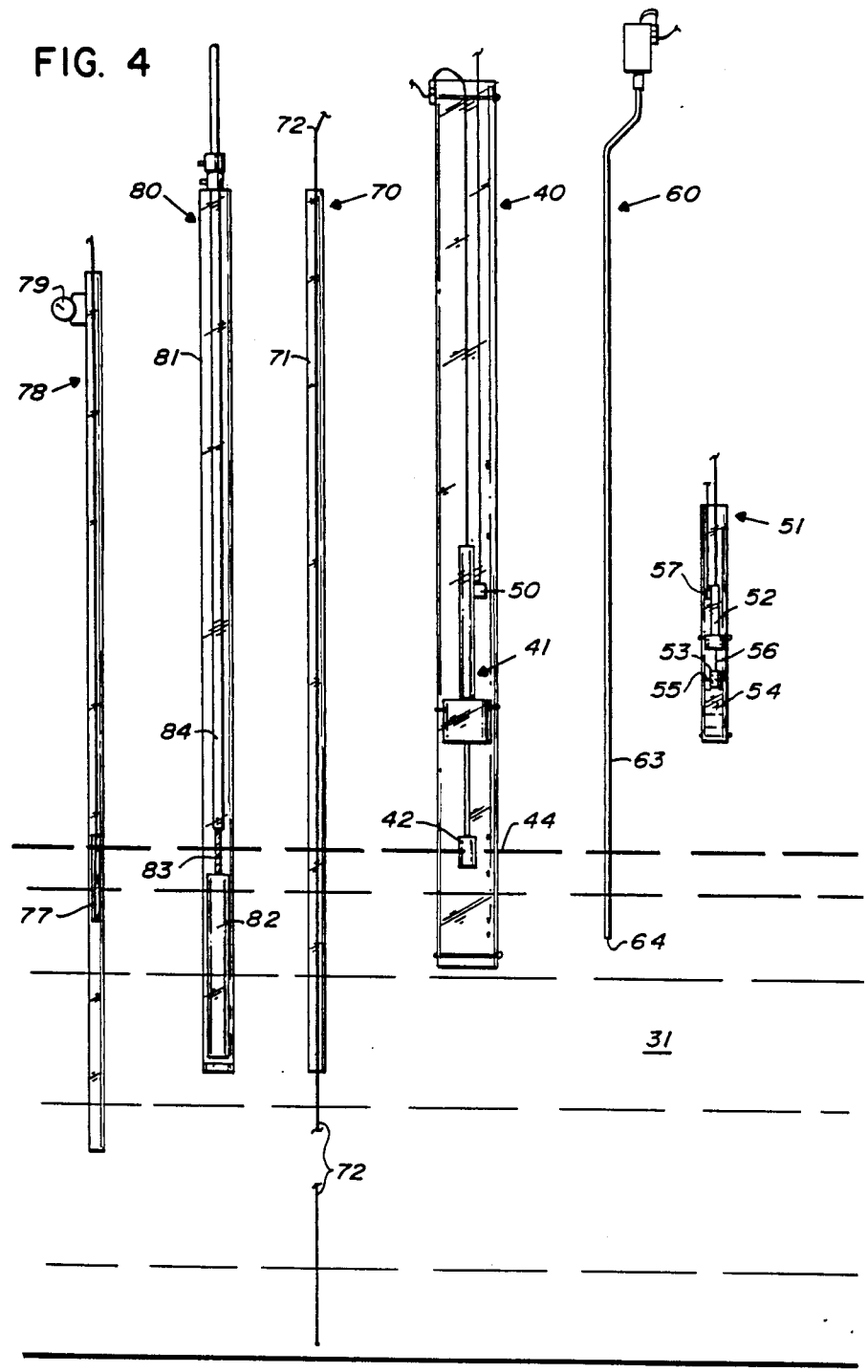

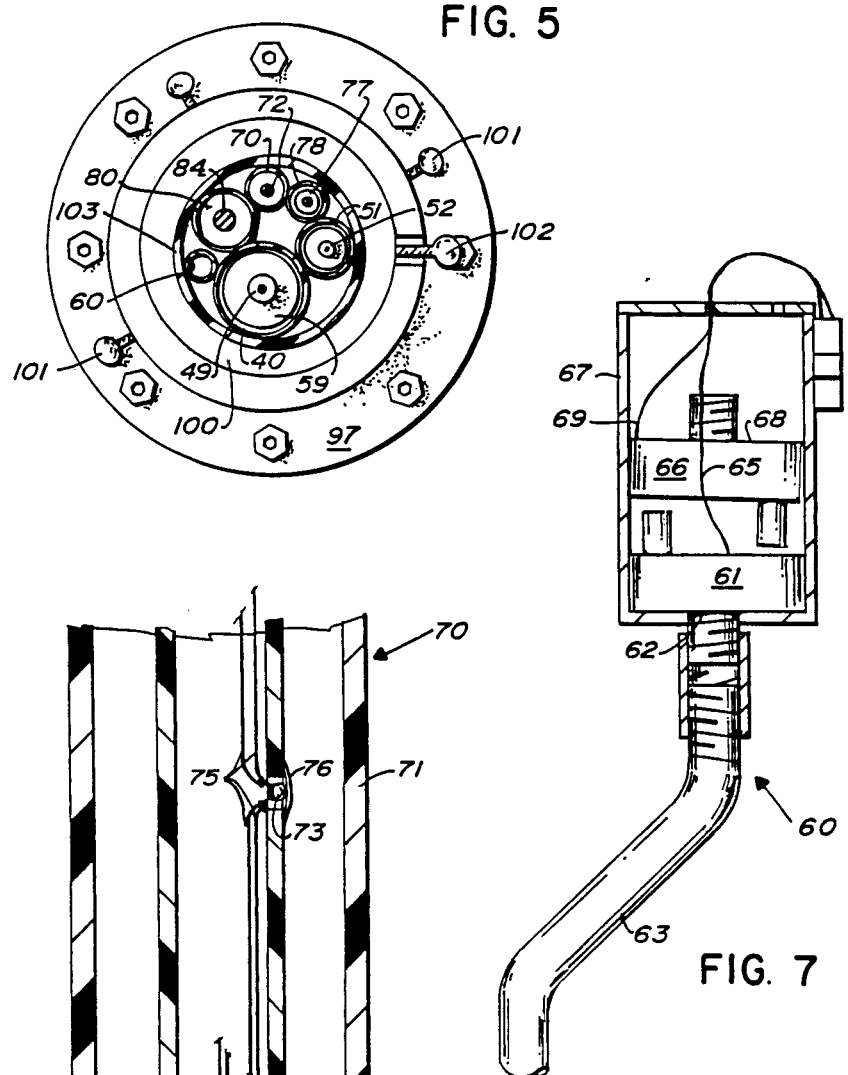
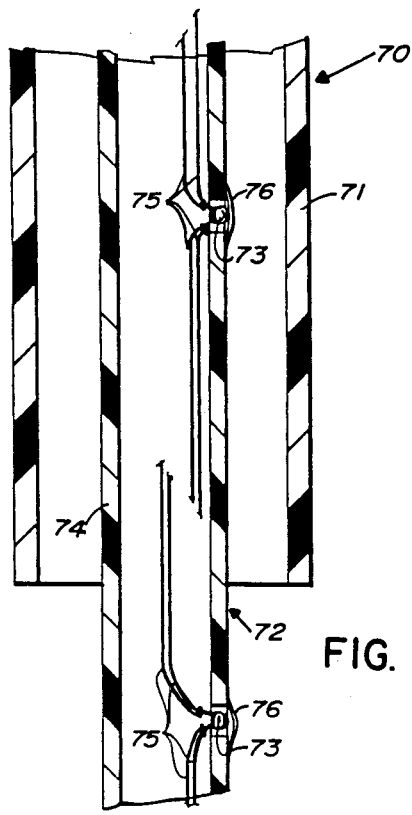

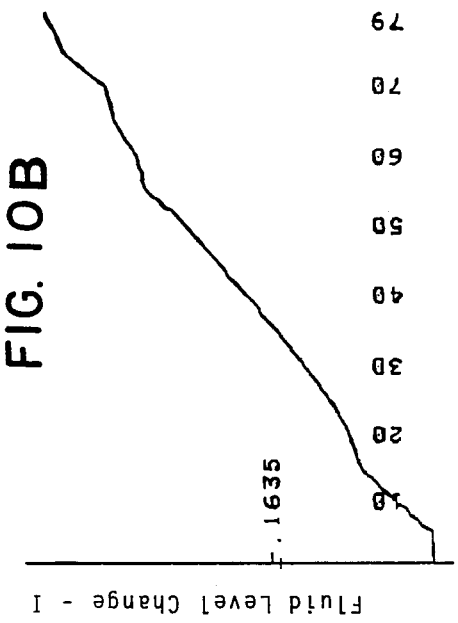
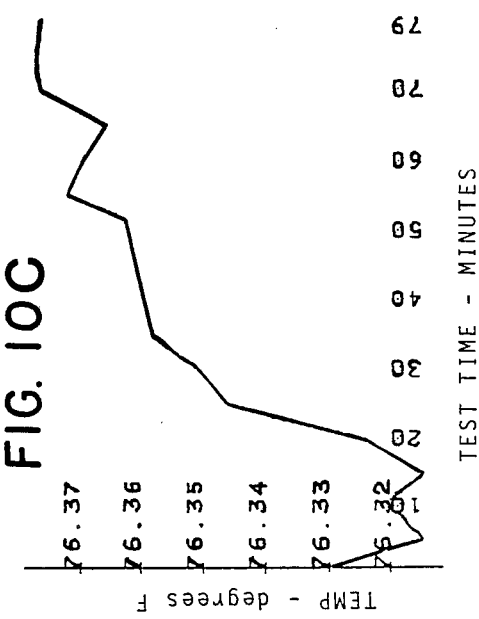

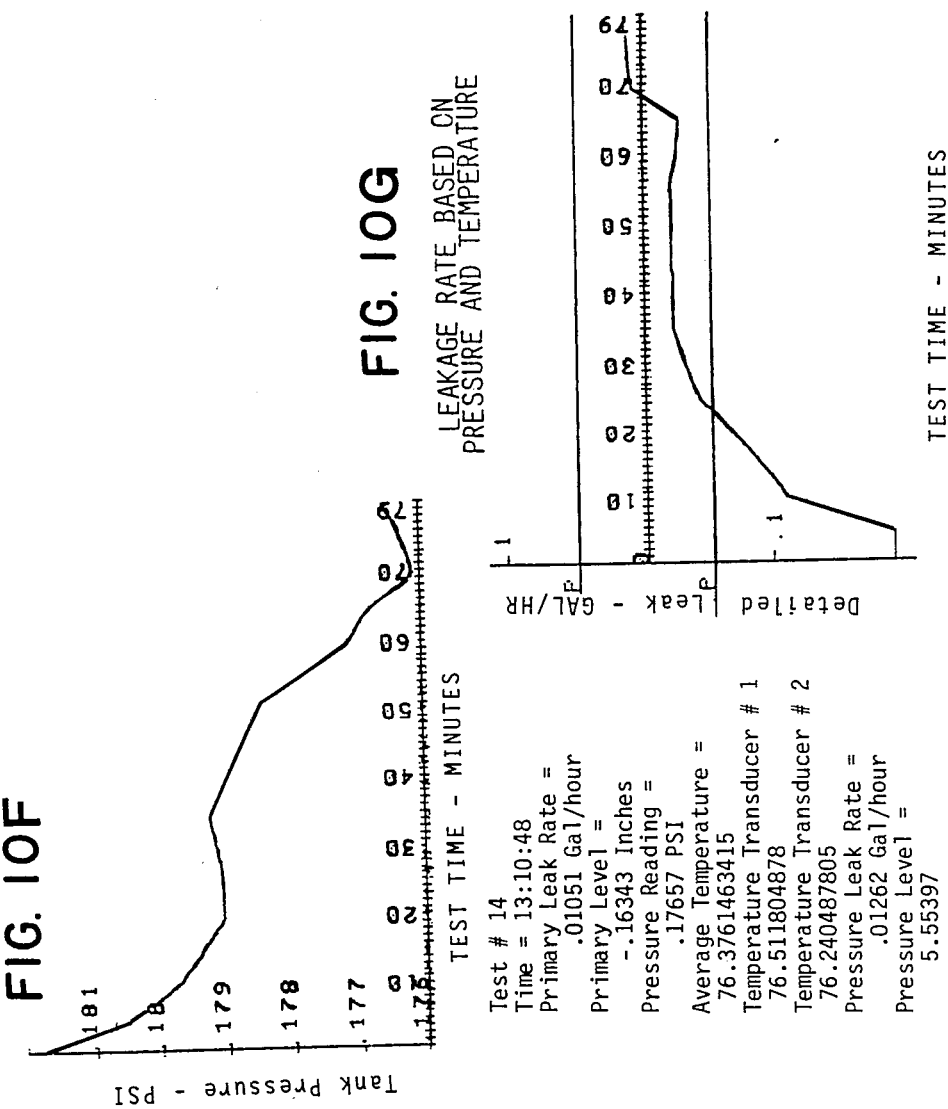

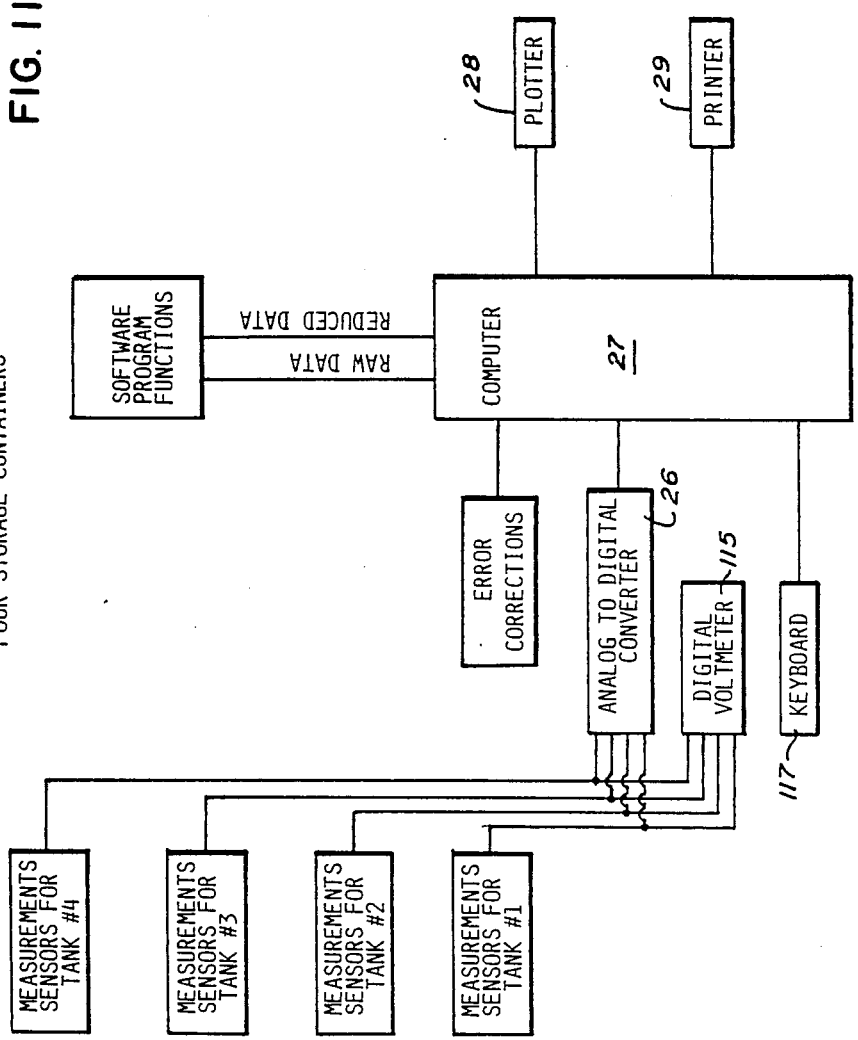

BLOCK DIAGRAM OF COMPUTER PROGRAM
SOFTWARE FUNCTIONS

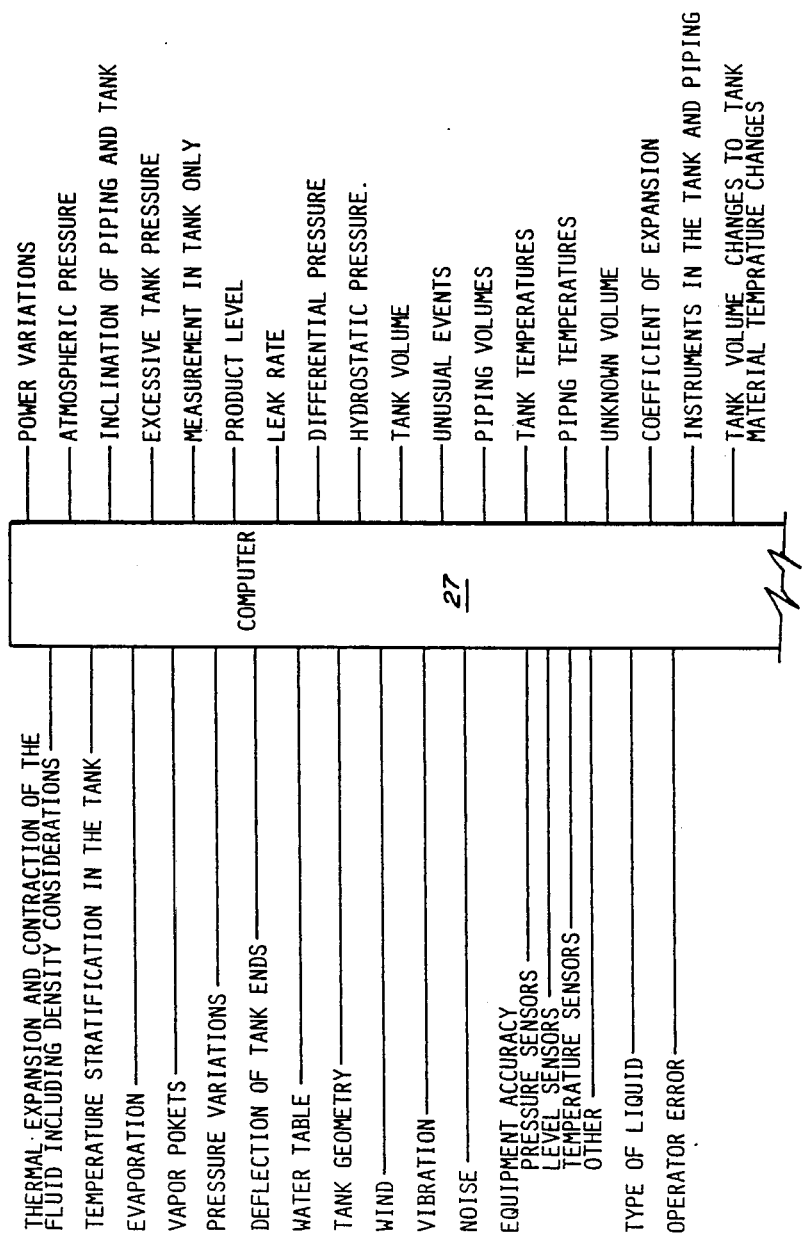
FIG. 16 CORRECTIONS

FIG. 17 MEASUREMENTS

**MINIMUM SYSTEM
(LEVEL AND TEMPERATURE)**

LIQUID LEVEL ─────────────┐
                          ├─► 115 DIGITAL MONITOR
TEMPERATURE OF LIQUID ────┘
(SINGLE SENSOR)

**MINIMUM SYSTEM
(PRESSURE AND TEMPERATURE)**

LIQUID PRESSURE ──────────┐
                          ├─► 115 DIGITAL MONITOR
TEMPERATURE OF LIQUID ────┘
(SINGLE SENSOR)

PREFERRED SYSTEM

LIQUID LEVEL WITH LVDT
LIQUID PRESSURE
TEMPERATURE OF INDVIDUAL SECTIONS ON STRATA OF TANK
TEMPERATURE OF PIPING
ATMOSPHERIC PRESSURE
TANK WALL TEMPERATURE
SPECIFIC GRAVITY OF LIQUID
INCLINATION OF PIPING AND TANK
LIQUID EVAPORATION
GROUNDWATER LEVEL
LIQUID DISPLACEMENT CALIBRATION
TEMPERATURE OF LIQUID PRESSURE SENSOR
TEMPERATURE OF AIR PRESSURE SENSOR
TEMPERATURE OF LEVEL SENSOR
TANK AND PIPING DIMENSIONS

─► 26 ─► 27 COMPUTER ─► CORRECTIONS (SEE FIGURE 16)

FIG. 22

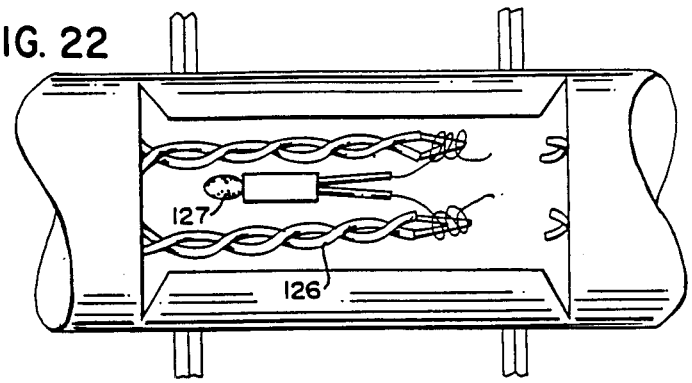

FIG. 19

| | |
|---|---|
| SECONDARY EXPECTED LEVEL CHANGE = | -.000 INCHES |
| SECONDARY APPARENT LEAK = | .045 GALLONS |
| SECONDARY APPARENT LEAK RATE = | .047 GALLONS/HOUR |
| STRATIFIED EXPECTED LEVEL CHANGE = | .005 INCHES |
| STRATIFIED APPARENT LEAK = | -.005 GALLONS |
| STRATIFIED APPARENT LEAK RATE = | -.005 GALLONS/HOUR |
| AVERAGED MEASURED LEVEL CHANGE = | .00806 INCHES |
| AVERAGED VOLUME CHANGE = | -.0143 GALLONS |
| AVERAGED EXPECTED LEVEL CHANGE = | -.00675 INCHES |
| AVERAGED APPARENT LEAK = | -.031 GALLONS |
| AVERAGED APPARENT LEAK RATE = | -.036 GALLONS/HOUR |
| AVERAGED STRATIFIED VOLUME CHANGE = | -.0078 GALLONS |
| AVERAGED EXPECTED STRATIFIED LEVEL CHANGE = | -.00370 INCHES |
| AVERAGED STRATIFIED APPARENT LEAK = | -.025 GALLONS |
| AVERAGED STRATIFIED APPARENT LEAK RATE = | -.028 GALLONS/HOUR |

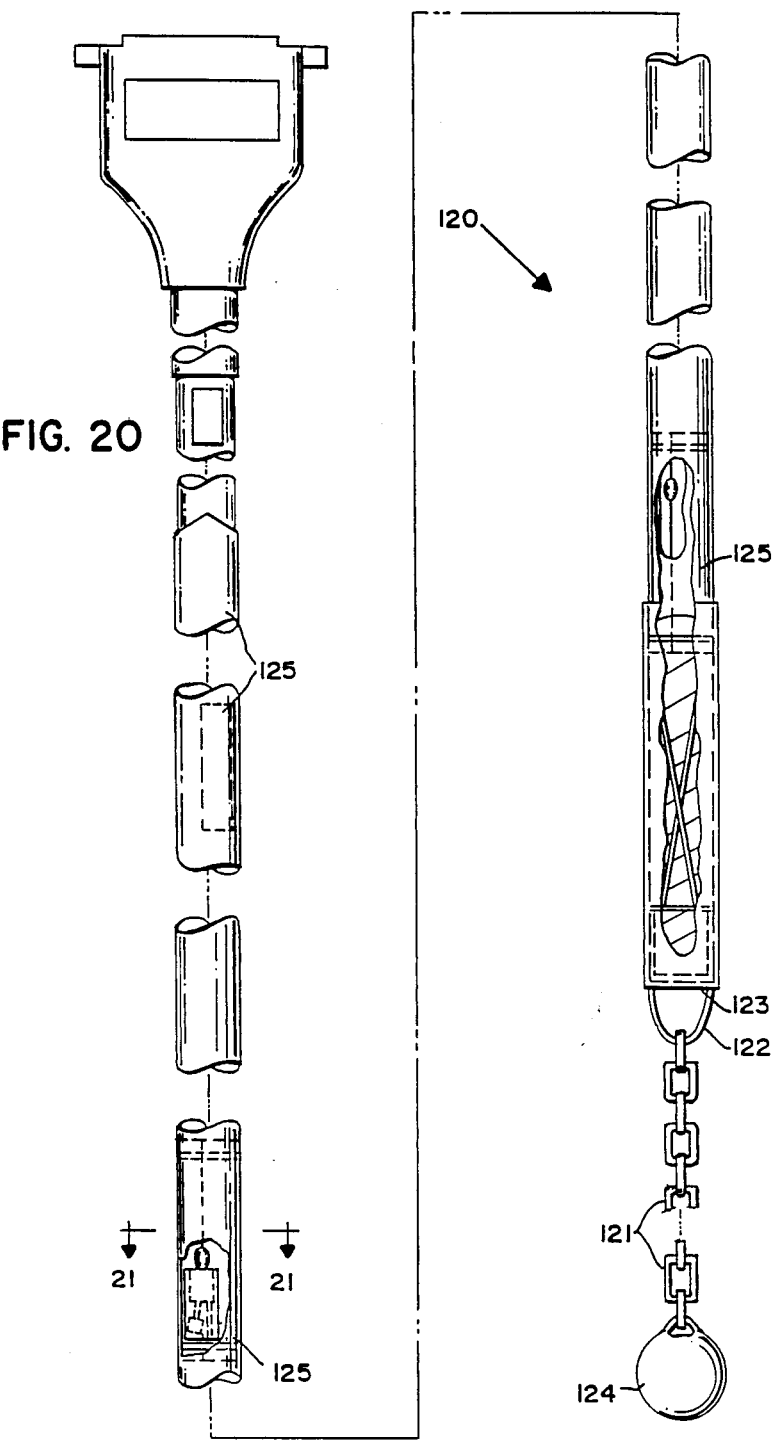

VOLUMETRIC LEAK DETECTION SYSTEM FOR UNDERGROUND STORAGE TANKS AND THE LIKE

REFERENCE TO RELATED APPLICATION

This application is a continuation-in-part of application Ser. No. 933,472 now abandoned filed Nov. 20, 1986.

This invention relates to a volumetric leak testing system for periodic and for continuous leak measurements from underground storage tanks and the like. It relates to a system to be employed with filled or partially filled storage tanks, and also with open tanks and sump tanks. It applies to tanks of all sizes and materials and containing any liquid.

BACKGROUND OF THE INVENTION

Tanks are used to store a wide variety of fluids and gases, especially petroleum products, as well as other liquids containing or consisting of various chemicals, and also for storing water. Many of these tanks, or the piping connected to them, when tested, have been found to be leaking. Some current estimates indicate that from 1 to 5% or even more of such tanks leak. Leaking tanks or leaking piping connected to them contaminate the ground water and cause other types of environmental pollution and also become health and safety hazards.

In recent years there has been much concern because the tank testing methods heretofore used to measure the amount of leakage from such tanks have been seriously inaccurate. The inaccuracies have been due to many measurement errors traceable to the equipment used, to significant limitations of the actual testing devices, to human errors in the calculation and reporting of the measurements taken, and to practical problems arising from the large number of manual operations heretofore required in data acquisition and processing. These prior-art measuring systems have failed to measure some of the key parameters affecting the determination of the leakage rate, including volume, inclination, and the temperatures in the tank and in the piping. These factors have resulted in many test results showing what is known as a false negative, that is, test results indicating that there was no leak when actually leakage was occurring. They also resulted in what is known as a false positive, in which the test results indicated that there was a leak, when in fact there was no leak. Moreover, the prior-art tests have been unable to discriminate reliably between tank and piping leaks.

Moreover, test methods presently in common use, have not been capable of reliably and consistently measuring the leakage rate to the accuracy required by various government agencies. For example, California and some other states require an accuracy to within 0.05 gallons per hour of leakage in the test. These accuracies have not been possible with most of the methods and equipment heretofore in use. Moreover, many of the people involved in taking the needed measurements, have not been properly aware of the many ways in which errors can creep in.

Claims of specified degrees of accuracy for these prior-art test methods have been incorrect, being off by factors ranging up to ten times and even more, and can be shown to be exaggerated, using an error analysis that covers all significant factors affecting the accuracy of these methods.

The traditional and the most commonly used volumetric tank leak measurement methods have been very time consuming. Even when they have been properly employed, such methods have required an excessive number of hours for completion of a proper volumetric tank leak test. The long test times involved have resulted in high costs because of lengthy test-conduction time and also to the down time of the operation involved while the tank is not in operation.

As examples of the several types of systems that have been used to make these tests heretofore, two commonly used methods will be described.

(1) A first prior art method is known as a fluid static test. The tank and a standpipe are filled with liquid, and a loss or gain in volume in the tank and in the fill pipe is then measured by using a one-gallon graduated column in the standpipe. A single temperature sensor has been installed in the tank for manual measurement of the temperature of the liquid, apparently relying on a mistaken assumption that the temperature is the same throughout the liquid. An attempt has been made to obtain uniformity of liquid temperature by installing a circulating pump and a tank discharge hose, but is not sufficient to achieve a uniform liquid temperature. In this system manual measurements have also been made by visual readings of the change in liquid level in the graduated column and a hydrometer for specific gravity of the liquid. From these few measurements a liquid leakage rate for the tank has been calculated.

This first method is unable to discriminate between tank piping leaks and tank leaks, because the standpipe must be used above the level of the liquid in both the tank and the piping. Inaccuracies here could lead to unnecessary excavations and tank removal. Moreover, this first method is unable to take into account liquid level changes due to external tank piping which is not part of the fill pipe. Furthermore, this first method has required manual recording of data, visual measurement of the liquid level changes, and manual computation of the leakage rates, all of which tend to give rise to error. Further, the manual computation of the leakage rate does not take into account all the factors of significance to the accurate determination of the leakage rate. Hence, the accuracy of the system has been very limited, while the time needed to conduct the tests has been excessively long.

(2) A second prior art method has been operated on the principle that an apparent loss in weight of any object submerged in the liquid equals the weight of the displacement volume of the liquid. This method therefore employs a hollow cylinder which is sealed at its bottom end, an analytical balance, and a strip chart recorder. The analytical balance includes a sensor suspended from it into the tank liquid. The weight of the sensor, as measured by the analytical balance, is equal to its actual weight minus the buoyancy force from the liquid in the tank. Changes in liquid level from a leak or from other causes will change the buoyancy force on the hollow cylinder and the weight of the sensor, and the analytical balance measures the weight change. The analytical balance has then converted this weight change to an electrical signal transmitted to the strip chart recorder, which shows volume change plotted against time. The angle and length of the line drawn by the recorder has been directly related to the quantity and rate of the leakage. Meanwhile, a thermistor has been lowered into the center of the tank, and the temperature of the liquid at that single location measured. Volumetric changes in the liquid are determined by manually computing only the product of the temperature change, the volume of the tank, and the coefficient of expansion of the liquid in the tank. Therefore, the system accuracy and reliability of this second method are also quite limited. This method does not account for many sources of possible error, including the possible effects of ground water on the tank and on the leakage rate therefrom. The single temperature sensor in the tank does not accurately measure the volumetric changes due to temperature, because there are different temperatures in the tank, with a temperature gradient from the top all the way to the bottom of the tank. The manual calculations and recordings are also subject to human error.

Other prior-art systems have severe accuracy limitations, or do not account for or measure key factors that affect the leakage rate of the tank, or have prior resolution of the leak rate, or all or several of these problems. They tend to result in "false negatives" and "false positives". All of them require long test times.

Without further reviewing other systems, it can generally be stated that there are many causes of inaccuracy in these and other methods. These causes vary in either positive or negative amounts from a zero reference point. These causes of error may be listed as follows:

1. The liquid is subject to thermal expansion and contraction, which affects density considerations as well as the actual volume to be measured.

2. There is temperature stratification of the fluid contained in the storage tank; therefore temperature measurements at any one level do not give a proper reflection of the various temperatures of the liquid in the tank and its associated piping or the average temperature, and the effects of these temperatures.

3. Evaporation of the liquid from the tank and its piping during the test may appear to be leakage and may be treated as leakage, because any reduction in volume is assumed to be leakage. Evaporation not compensated for is usually recorded as leakage, even when in fact there is no leakage whatever.

4. Vapor pockets are present in many tanks and in the associated piping during the measurement, and these are not accounted for.

5. There are pressure variations in the liquid and also in the atmospheric pressure above the liquid in the storage tank. Since tests take a significant time to conduct, there is bound to be error from this source, unless these pressure variations can in some way be taken account of and included in the calculations. Current methods have not been able to take these pressure variations into account.

6. The ends of the storage tanks deflect during and after filling. This deflection results in an increase in the tank volume. The rate of volume increases with time until stability is reached, and then there is no additional change in tank volume due to deflection. The increased volume in the tank lowers the load of the liquid in the tank and gives the appearance of a leak.

7. The water table and effects of ground water have not been considered, although their effects may be a significant source of error in the final results. For example, if the water table is above any portion of the tank, a leak could be missed, due to the higher pressure head.

8. The geometry of the tank under consideration has usually been neglected, it being assumed that so long as the tank has a certain volume under certain conditions, the geometry of the tank is not important to consider. However, this geometry may seriously affect the accuracy of the final results. Many systems are sensitive to the product level and/or to the temperature, so that tank and piping specifications effect the accuracy of leakage measurements. The differences between the manufacturer's specifications and the actual tanks and piping are important. For example, measurement of the liquid level in piping demands on accurately knowing the internal diameter of the piping, the cross-sectional area of the instrumentation inside the piping, and the cross-sectional area of other attached piping. Volumetric change due to temperature depends on the actual volume of the tank and piping, not the nominal specifications. The level measurement in the tank depends on the cross-sectional area of the tank in the vertical axis.

9. The effect of wind has almost never been considered. Yet wind can effect the level measurements, the temperature, the pressure, and the evaporation rate of the liquid. For example, a strong wind can create a wave in the exposed piping, resulting in irregular fluctuations in the liquid level.

10. Vibration is present in some tanks but not in others. Vibration may be due to wind, traffic, earthquakes, or construction work. It may vary due to the nearness to a highway used by large trucks, sometimes during measurements and sometimes not. Whatever the cause, vibration of the tank is a serious cause of error. Vibration effects increase with the free surface area under test and is much larger when measuring in the tank instead of in the fill pipe. Vibration can also affect the temperature measurement by moving the temperature sensor and causing erros in its reading. This is a particular problem in large tanks, such as a 50,000-gallon tank, where temperature measurement accuracies of better than 0.003° F. are necessary.

11. Noises from acoustical sounds and electrical noise are other sources of error that have generally been disregarded when trying to detect tank leaks.

12. The accuracy of the equipment is a well-known source of possible error, yet most of the equipment used simply does not have the accuracy required. The instruments must be precise in order to avoid error, because if the instruments themselves are inaccurate, the results will be; if several measurements are taken and with different degrees of accuracy, one cannot know how much inaccuracy there is, or whether the inaccuracies balance or add to each other.

13. The limitations of the instrumentation have generally not been considered, although they are quite important. Typical limitations include thermocouple accuracy, the inability of certain equipment to make accurate measurements because of piping inclinations or even to measure in piping at all. Some instruments cannot give correct values in small pipes, including the fill pipe; some systems are unable to distinguish between tank leaks and piping leaks; some cannot operate accurately in some types of liquids; some cannot take groundwater into account. None can operate accurately without removing the tank's drop tube.

14. The type of liquid in the tank and its specific gravity is often not taken into account and can produce error.

15. Operator error is one of the most significant sources of error and has generally been underestimated or assumed not to be present. It is present to some extent in all tests, but it is most prevalent and significant in systems that require manual measurements and manual computations.

16. Power variations occur, and equipment responsive to these power variations is therefore subject to the errors introduced by these variations. Rarely has compensation been made for this or steps taken to eliminate such power variations.

17. Atmospheric pressure has, in most instances, not been measured at all, and it has generally been assumed to remain constant during the test. It may be that in some tests the atmospheric pressure does not change and that a standard measurement is sufficient, but usually this is not the case, because altitude and climatic changes, as well as weather, affect the atmospheric pressure, which should therefore always be directly considered. Atmospheric pressure changes are particularly significant in cases where there are vapor products in the tank or piping.

18. Inclination of the tank fill pipe and of the tank has generally been disregarded. The assumption is made, without even considering it, that there is no such inclination, yet there usually is, and that inclination can affect the accuracy of measurement. In an inclined pipe or tank, the volume change per unit level change is different from that of horizontal pipes and tanks.

19. The tank pressure during the test may exceed the normal operating pressure. When this happens, and when proper allowances are not made, errors inevitably occur. Higher tank pressure results in a higher leakage rate than for normal tank pressure. Also, high tank pressures can damage tanks.

20. Prior-art measuring systems have usually not discriminated between piping leaks and tank leaks. Discrimination is extremely important. If the tank leaks, tank replacement is normally required. When the leak is in the piping, a completely different remedy is, of course, required. Hence, if the results of the test are wrong, high and unnecessary costs result.

21. When the liquid level is below the level of the fill pipe, the measurement of tank leakage becomes extremely difficult and requires a system that is 1000 to 10,000 times more accurate. No previous system has been capable of measuring leakage rates *in the tank*, rather than in the fill pipe.

22. The level of the product in the tank affects the leakage rate. If the liquid level is higher than the normal maximum level, the leakage rate is higher than normal. The leakage rate is proportional to the square root of the pressure. Also, a lower-than normal pressure results in a lower-than-normal leakage rate.

23. The leak rate may vary, depending on various factors which have usually not been considered, such as the location of the tank in relation to the liquid level in the tank and piping, the type of liquid in the tank and the groundwater level.

24. Differential pressures should be considered for methods employing either pressure or level measurements in computation of the product level variations, which are due to pressure, temperature, and leakage, but generally have not been.

25. Hydrostatic pressure and the properties of the liquid, such as its bulk modulus, should always be considered, but generally have not been.

26. The true volume of the tank is important, and yet has usually not been considered. It has been assumed to be whatever its nominal voluе is, rather than its actual value. Any difference from true volume reflects directly the leakage rate error and introduces an error into the calculations.

27. Unusual events may affect the accuracy of the measurement. These may include unexpected movement of the measuring instruments during the tests and so-called "acts of God", etc.

28. A volumetric measurement error is often obtained due to the effect of the volume of the liquid in the vent pipes, the vapor recovery lines, and the fuel lines, in relation to the volume of the liquid in the fill pipe riser. Usually, nothing has been done to take this source of error into account.

29. There are temperature effects traceable to the liquid in the piping that is connected to the tank, but these have usually been disregarded, and another source of error thereby has entered.

30. When the volume in the tank is unknown, there is also a temperature effect that cannot properly be considered. This, also, gives rise to errors.

31. The piping also may have an unknown volume or one that is not being considered, and this may affect the accuracy of the temperature measurement and therefore the final results.

32. There may be a volumetric measurement error, if the true volume of the tank is not known.

33. Often the temperature coefficient of expansion of the liquid is not determined precisely. For example, the coefficients of expansion of various types of gasoline—leaded, unleaded, "regular", "aviation", jet fuel, for example—are not normally determined in current test methods or taken into account, and this neglect affects the accuracy of the results.

34. When the partly underground tank is being filled from a tank truck, the temperature of the two liquids may be at greatly different temperatures, and failure to take both temperatures into account can lead to substantial errors.

35. Water present in the storage tank has a different coefficient of expansion for gasoline or oil, and treating them as identical leads to errors of computation.

A few systems have proposed to take some of these errors into account, but all systems, of which I am presently aware, have not considered many of these limitations on their accuracy. No one method currently in use is able to solve a significant number of the thirty-three problems listed above. Heretofore, no one method has solved even a significant number of these problems.

Systems currently in use have also required long test times to provide even a degree of optimization of their rather poor accuracy measurements.

SUMMARY OF THE INVENTION

This invention attacks all thirty-three of the error-causing factors identified above and when practiced properly provide reliability, accuracy, and automatic data reduction.

It includes a computerized automated system for volumetric leak detection, incorporating, among other things, two independent methods of determining leakage rate. (1) pressure and temperature measurement and (2) level and temperature measurement. These independent measurements are compared with each other and are only used when they are substantially the same. When they are substantially different, each method is checked to find the source of the discrepancy, and then the discrepancy is eliminated.

(1) A pressure sensor measures the tank pressure at a fixed location in the tank, while related temperature sensors measure a series of liquid, air, and tank wall temperatures at various locations. Several supplemental measurements are also made to determine the product level changes in the tank, and piping, whether due to leakage or to other factors. No extra pressure is applied to the tank liquid.

A pressure sensor measures the pressure of the tank liquid at a fixed location in the fill pipe. Knowing pressure changes and the specific gravity of the liquid, an indirect measurement of liquid level changes can be determined. Knowing the liquid level change and cross sectional area of the piping in the fill pipe, the volume change or apparent leakage rate can be determined.

The temperature effect is the major parameter that is used to correct the apparent leakage rate. Temperature sensors measure the liquid temperatures in the tank and piping. This measurement is used to determine the volumetric liquid level change due to temperature variations during the test and is used as the correction for temperature effects. This is the major correction for leakage rate.

Knowing the leakage rate from level changes and subtracting the leakage rate due to temperature changes, a corrected leakage rate can be determined.

It should be emphasized that this pressure method, like prior methods using pressure sensors, cannot measure with sufficient accuracy to determine leakage rates within 0.05 gallons per hour or less in open tanks or below the fill pipe in tanks having fill pipes, where the tank itself has cross-sectional area greater than about one thousand square inches. The present method performs extremely well for tanks with fill pipes or risers.

(2) The simultaneous electro-mechanical measurement of level and temperature is done by an electromechanical level sensor which measures the liquid levels at the top of the tank or the fill pipe, and by combining those data with the temperature sensors as used in (1) above. Again, supplemental measurements are also taken to determine the product level changes in the tank and piping, whether due to leakage or to other factors.

An electromechanical linear variable displacement level sensor measures liquid levels at the surface at the top of the tank or fill pipe. Knowing the level change and the cross-sectional area of the fill pipe, the volume change and apparent leakage rate can be determined.

Once again, the temperature effect is the major parameter that is used to correct the apparent leakage rate. Again, temperature sensors measure liquid temperatures in the tank and piping. These measurements are used to determine the volumetric liquid level change due to temperature variations during the test and are used as the correction for temperature effects. This is the major correction for leakage rate.

Knowing the leakage rate from level changes and subtracting the leakage rate due to temperature changes, a corrected leakage rate can be determined.

The electromechanical linear variable-displacement sensor used for this invention must be sufficiently accurate to result in determination of the leakage rate to an accuracy of 0.05 gallons per hours. Therefore, method (2) is the only one used for measurement in open tanks or in all tanks when measuring below the fill pipe.

In addition to these two major corrected measurements, a number of supplemental measurements are made that precisely determine other corrections of product level changes in the tank and piping. These are presented in detail below.

The accuracy of each of these two methods is much greater than with prior-art methods. However, this dual measurement method also provides redundant measurements and checks of leakage and results in an even lower probability of either a false negative or a false positive test result. Therefore, when this dual method shows that there is leakage, there is leakage; and when this method shows that there no leakage, there is no leakage. Further, the dual measurements supplement and complement each other so as to result in improved accuracy as to the amount of leakage, when there is leakage. The system therefore measures the following things:

1. Liquid volume
2. Liquid pressure
3. Atmospheric pressure
4. Liquid level
5. Liquid temperature
6. Temperature stratification in the tank
7. Air temperature
8. Sensor temperatures (temperatures of the sensors measuring pressures and liquid levels.
9. Liquid volume in the tank relative to the fill tank and piping
10. Piping inclination
11. Liquid specific gravity
12. Ground water levels
13. Liquid level change due to insertion of a solid calibration cylinder of known volume to displace an equivalent volume of the liquid
14. Horizontal length of the piping
15. Vertical height of the piping
16. Internal diameters of the piping
17. Piping internal diameter and length where the instrument tube assembly is inserted in the tank.
18. Internal diameter of the tank
19. Tank shape (cross-sectional area as a function of height)
20. Tank material wall temperature.

In addition to the measurements, a calibration is performed prior to the start of the tank test. A known volume of liquid (typically 1 to 3 cubic inches) is displaced during the tank test to provide a calibration to determine effects of the cross-sectional area and length of all the piping in relation to the tank piping where the instrument tube assembly is installed.

In the case of tank testing only, such as a tank filled to below the level of the fill pipe or an open tank, a much larger volume of liquid is displaced. This increased volume (typically 100 cubic inches) is needed since the cross-sectional area is much larger, and the level change for an equivalent leak volume is one thousand or more times less.

A check of the liquid level measurements or a third independent liquid level measurement is also provided by visually observing the liquid level in the test pipe at locations above grade level.

The measurements are continuous and automatic and are corrected for all of the error causing means listed above.

The invention either eliminates each of the thirty-three problems discussed above, or else reduces their effect on the leak rate results to a point where they are insignificant.

The invention affords a very high level of accuracy and leak resolution, and it offers a very short test time relative to any other method previously used. The system may be completely computerized so that there need be no recording of data manually or reduction of data manually. It exceeds all the local, state and federal requirements in the United States at the present time, with a leak detection accuracy of 0.005 gallons per hour or better. It automatically corrects for all the inaccuracies and errors of significance in the determination of the leakage rate, and is completely automated, so far as its measuring system is concerned and the transmission of data to the computer. At the computer, the data is compiled and calculations are made. During the test there is continuous data processing, and the test results are printed out or displayed during the test for review, monitoring and evaluation, and final results are provided within minutes after the completion of the test.

The system of this invention can be operated without an operator and in an unattended mode, or even by remote operation when hazardous environments are involved.

The invention comprises the following:
a. Overall systems and techniques
b. Testing technique and operational procedures associated with the tank leak test system to optimize performance.
c. Test pipe and extension apparatus
d. Instrumentation tube apparatus
e. Sensors and sensor housings
f. Calibration apparatus
g. All system components
h. System software with tank leak measurement model.
i. System operational procedures
j. Data acquisition, reduction and processing system
k. Computer printouts
l. Test report and certification forms.

The computer printouts of the measurements, corrections, calculations, and results include:

(a) The leakage rate based on the liquid level obtained by both (1) measuring the liquid level from the direct output of a linear variable displacement sensor and the temperature of the liquid in the tank and in the piping, (2) measuring and correcting the liquid level by computations using liquid and atmospheric pressure measurements and the temperature of the liquid in the tank and in the piping.

(b) The volume of the tank and of the piping.
(c) Correction for the effects of atmospheric pressure and tank liquid pressure.
(d) Corrections for the effect of temperature strata or layering of the liquid, air, in the tank and in the piping.
(e) Correction for the effect of liquid evaporation.
(f) Correction for the effect of uncertainty in the tank volume due to the inability of precisely measuring tank volume.
(g) Correction for the inclination of the tank test pipe.
(h) Correction for the volumetric displacement of the instrumentation which is placed in the tank fill pipe or elsewhere in the tank.
(i) Correction for the liquid volume in the piping.
(j) Temperature measurements of all significant liquids in the tank and piping, including
 (1) the temperature of up to twenty horizontal layers or even more of the tank volume,
 (2) the temperature of the liquid in the piping;
 (3) the temperature of the ambient air above the liquid, and
 (4) the temperature of the tank wall.

(k) The pressure measurements of all the significant tank and piping liquids including:
 (1) the liquid in the tank,
 (2) the liquid in the fill pipe, and
 (3) the atmospheric pressure, i.e., the ambient pressure above the level of the liquid.
(l) The level of the liquid in the tank and in the piping by direct measurement using a linear variable displacement sensor.
(m) The level of the liquid in the tank in the piping as calculated from the pressure measurement in the tank liquid and the atmospheric pressure.
(n) The rate of tank liquid evaporation.
(o) The error bounds on the leak test due to errors flowing from the unknown geometry of the tank and piping, errors in sensor measurement, and equipment errors.

The computer may also print out the name of the tank owner and the identification of the particular tank.

The method of this invention is nondestructive and does not damage the tank. Moreover, since the tank requires only normal operating pressures, no tank damage can occur because of overpressurizing the tank. Also, the method does not involve removal of the tank drop tube, thereby eliminating possible damage to the tank from such removal. The invention can be used on any size and type of tank. It can be used on open tanks without fill pipes, and it can be used on open sump tanks. It can be used on tanks having fill pipe diameters of one inch or greater. It has the capability of testing tanks up to volumes of 100,000 gallons and, in fact, even more. It is capable of testing up to four tanks simultaneously.

Of prime importance is the fact that it accurately detects tank leaks and piping leaks and discriminates between tank leaks and piping leaks and in tank levels and leaks in piping at the top of the tank. It can be used for basically any type of liquid, or at least any kind which does not damage the instruments. Since it provides for two independent volumetric measurements of leakage rate, and for comparison between them, it ensures substantial accuracy. It enables on-site calibration of the system and the calculation of leakage rate resolution and accuracy.

As a result of the equipment and method of this invention, the determination of whether there is leakage and what the rate of leakage is involves a short down time in comparison to other methods, and since it already contains an inherent redundancy, eliminates repeat tests. Since everything is done by automatic measurement and calculation, almost all personnel errors are eliminated. It is also possible to use the apparatus and method in a continuous monitoring system for tank leakage rates.

BRIEF DESCRIPTION OF THE DRAWINGS

FIG. 4 is a partially exploded view in elevation and in section of the instrumentation apparatus for calibration and measurement of various factors.

FIG. 5 is an enlarged cross-sectional view of the instrumentation assembly, taken along the line 5—5 in FIG. 2.

FIG. 6 is a greatly enlarged sectional view of a portion of the tank temperature measuring array of transistors.

FIG. 7 is an enlarged fragmentary view in elevation and partly in section of the pressure and float for pressure measuring of the liquid.

FIG. 10A is a view of a typical computerized printout of the leakage rate data and other pertinent information and FIGS. 10B-10G are graphs of a typical computerized plot of leakage rate and other important information and data obtained from practicing the invention.

FIG. 11 is a flow diagram for monitoring four tanks in the tank leak system of the invention.

FIG. 16 is a diagram of the error correction functions.

FIG. 17 is a block diagram of the measurement inputs to the data acquisition unit and the digital monitor.

FIG. 19 is a view like FIG. 10 of a portion of a printout containing information in addition to that shown in FIG. 18.

FIG. 20 is a view in elevation, broken in places and also partly broken away in other places of an improved temperature probe cable assembly.

FIG. 22 is an enlarged view partly broken away of a portion of FIG. 20 near the line 21—21.

DESCRIPTION OF A PREFERRED EMBODIMENT OF THE INVENTION

Figure 1:
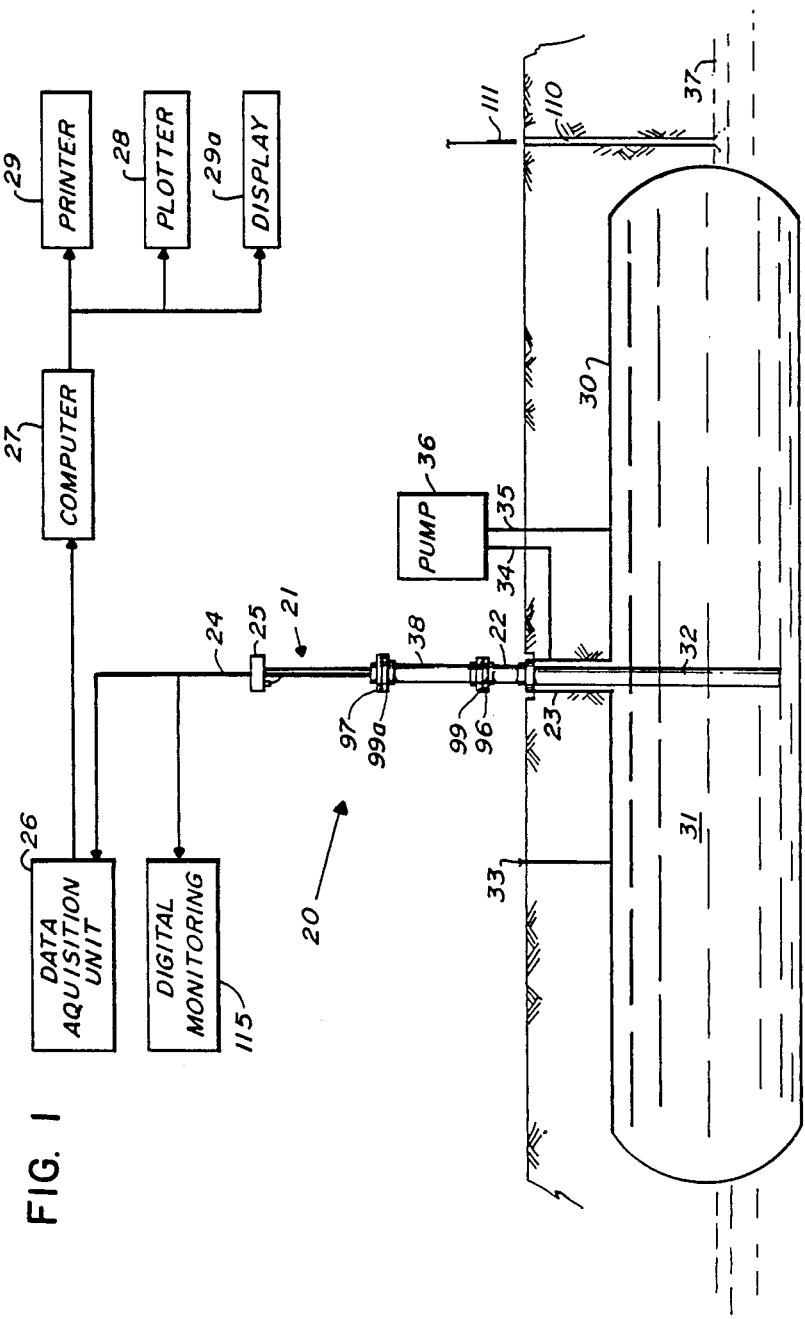
FIG. 1 is an overall schematic view of an apparatus embodying the principles of the present invention and enabling practice of the method of the present invention.

FIG. 1 is a simplified view of the invention in which a testing system 20 comprises a test instrumentation assembly 21 comprising various sensors and calibrating devices, as described below. The assembly 21 may be installed in a test pipe 22, which is connected to the top of a tank fill pipe 23 or, if the tank is an open tank, to a suitable adapter. Outputs from the sensors and input power are provided through a multiconductor electronic cable assembly 24 which is connected to an instrumentation rack 25. The electronic cable assembly 24 is connected to the sensor power supplies 116 (FIG. 12) and to a computer-controlled data acquisition unit or analog-to-digital converter 26, e.g. Hewlett-Packard model 3421A.

The Hewlett Packard Model 3421A data acquisition system processes temperature and other sensor data. The data acquisition system, an analog-to-digital converter, is accurate to 0.009% of reading+3 counts for DC voltage measurements and 0.012% reading+3 counts for resistance measurements. Thus, the system is capable of a 1 ohm or better resolution for a 10,000 measurement.

The data acquisition unit 26 is connected directly to a digital computer 27, e.g. Hewlett-Packard Model HP85 A or HP85 B or HP9807 A, and the output from the computer 27 may be connected to an integral plotter 28, a printer 29, and a display unit 29a and may be provided with other ancillary monitoring equipment.

Measurements from the sensors are automatically computer processed, resulting in essentially negligible errors in the processing of the data from the data acquisition unit 26. This is in contrast to manual processing of data as is currently performed in other volumetric tank leak testing systems.

Computer software controls and adjusts the automatic operation of the system, maintaining in memory all required tables, calibrations and other information, and automatically processes and displays data and test results. The computer 27 includes a keyboard and input terminal 117, a timer as well as a memory, and it examines and processes the pressure, level, and temperature measurements, displacement calibrator data, sensitivity and temperature sensitivity of the pressure, level, and temperature sensors, the initial tank volume and liquid level, specific gravity, coefficient of expansion, bulk modulus of the liquid, test pipe liquid inclination angle, tank inclination angle, groundwater level, evaporation rate, temperature changes over the test period, the test period, tank and piping dimensions, tank temperature strata and the individual temperatures obtained for each stable temperature layer of the tank and fill pipe, and other factors prior to computing the leakage rate and other data.

In the invention as illustrated there is an underground buried storage tank 30 filled with a liquid 31. The tank 30, in addition to the fill pipe 23, has a drop tube 32, a vent pipe 33, a fuel line 34, a vapor recovery line 35, and a dispenser pump 36, the elements 33-36 being shown diagrammatically in FIG. 1. There may or may not be ground water 37 up to a level partially above the bottom of the tank 30. The tank 30, for example, may be a 10,000 gallon gasoline storage tank made of steel, and it may be about ten feet in diameter and thirty feet long. Its fill pipe 23 may be four inches in diameter and three feet long and made of steel. The drop tube 32 may be ten feet long, 3.75 inches in diameter and 0.060 inches thick; it may be made from aluminum. The vent pipt 33 may be 2 inches in diameter and 20 feet long. The fuel line 34 may be one inch in diameter and twenty feet long, and may be made of steel. The vapor recovery line 35 may be one inch in diameter and twenty feet long and made of steel.

Correction for water in the tank 30 is obtained by requiring the technician to input into the computer 27 the depth of water in the tank 30. The computer 27 then computes the volume of the tank 30 that contains water and uses the coefficient of expansion for water for the volume of the tank that contains water. In contrast, prior-art methods used the same coefficient for all the contents of the tank even if the tank contained water.

The test pipe 22 is used to hold the instrumentation assembly 21 and a test pipe extension 38, shown in FIG. 1. The test pipe extension tube 38 may be used for raising the liquid level to compensate for the static head of the ground water.

Figure 9:
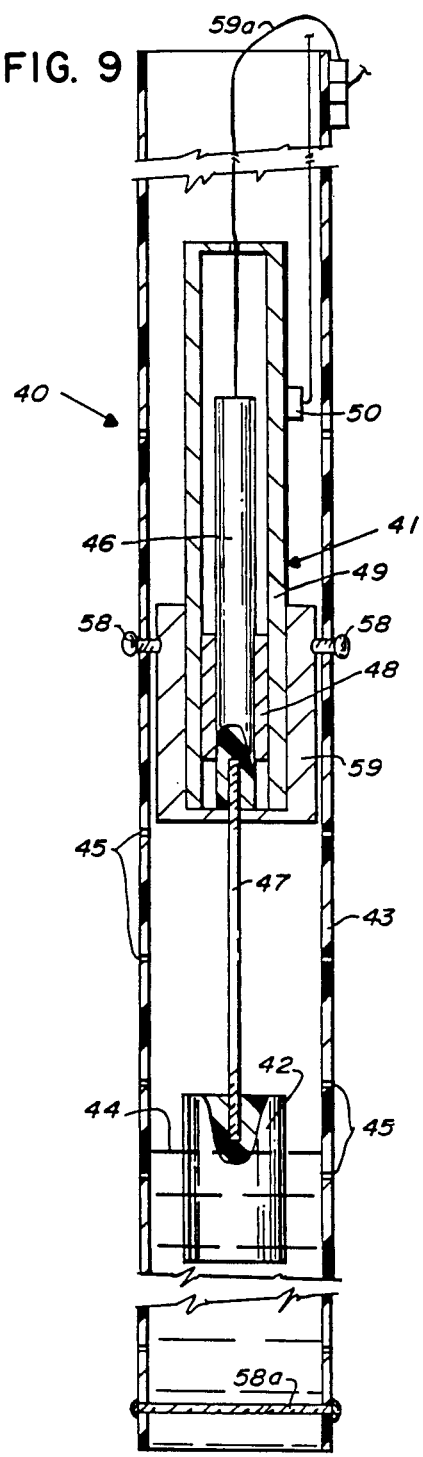
FIG. 9 is an enlarged view in elevation and in section of a preferred form of linear variable displacement transducer and float device. The view is broken at two places to conserve space.

The instrumentation assembly 21 may include a linear variable displacement transducer (LVDT) and float devide 40 (FIGS. 4 and 9) for liquid level measurement. The device 40 includes a linear variable displacement transducer 41 connected to a float 42, both contained in a liquid level monitoring tube 43 for continuously measuring the liquid level 44. The liquid level test tube 43 may be 0.5" to 2" or more diameter, approximately two to seven feet in length of Excelon-4000 or equivalent transparent rigid PVC pipe Schedule 40, in which is mounted the liquid level assembly 40. The tube 43 has bleed holes 45 for relieving air pressure that might restrain movement of the float 42. An armature 46 of the linear variable displacement transducer 41 is connected to the float 42 through a solid connecting rod 47 by threading and by an epoxy adhesive, preferably, and the float 42 moves vertically up or down with a corresponding change in the liquid level. A spacer 48 between the armature 46 and a cylindrical inner core 49 of the LVDT is provided to minimize horizontal movement of the armature 46, thereby essentially eliminating horizontal movement of the float 42. A temperature sensor 50 is attached to the linear variable displacement transducer 41 to monitor the temperature thereof. The transducer 41 converts the movement of the float 42 to an electrical output voltage proportional to the vertical float movement. The electrical output voltage is sent through the cable assembly 24 to the data acquisition unit 26 and from there to the computer 27, where liquid level changes are measured to better than 0.00001 inch. In the fill pipe 23 an accuracy of 0.1 is often sufficient; in the tank 30 the accuracy should be at least 0.001.

A screw stop 58a is threaded diametrically through both walls of the tube 43 at the bottom to prevent possible loss of the float 42 during insertion into the tank fill pipe 23. The test tube 43 may be further provided with three threaded set screws 58 in holes to enable fastening a float guide 59 at various vertical locations, thus permitting on-site adjustments for test conditions. The float guide 59 is preferably of aluminum and of slightly smaller diameter than the inside diameter of the test tube 43, so that its position inside the tube 43 can be easily adjusted, and its length varies depending upon the displacement length of the linear variable displacement transducer 41.

The float 42 is preferably about one half inch to one and one-half inch in diameter and may be mounted axially below the guide 59 on the axial float rod 47, which leads upward through the center of the guide 59 into the linear variable displacement transducer or level detector 41. Float level electrical signals are conducted by its cable 59a to the top of the test instrumentation assembly 21, where it is nested into the cable assembly 24.

The linear variable displacement transducer system 41 provides a direct measurement of the fluid level changes. The linear variable displacement transducer 41 may be a Shaevitz Engineering Model 1000 HPA or equivalent with Model ATA-101 signal conditioner or equivalent. The float 42 may be made of Nitrophyl material or equivalent material, in various sizes, typically 1¼" diameter by 1⅜ length). The stainless steel rod 47 is typically one-eighth inch in diameter and four inches in length and is placed inside the center of a stainless steel housing 43 that is approximately 1.5" outside diameter and 1.5" in length. A variety of sizes is used, depending on the dimensions of the fill pipe 23.

Movement of the float 42 in the vertical direction results in an output voltage of the signal conditioner which is directly proportional to float vertical movement. This LVDT 41 sensitivity with float movement is contained in the computer memory. Thus, voltage of the LVDT 41 is converted to vertical level change of the float). The LVDT output also varies slightly with temperature change, and this relationship is included in the computer memory. The temperature sensor 50 attached to the linear variable displacement transducer 41 monitors the temperature of the linear variable displacement transducer 41. Knowing the temperature sensitivity of the LVDT 41, the output of the LVDT from actual tank and fluid level is corrected for temperature by the computer 27.

The electrical output voltage from the LVDT 41 and the temperature sensor 50 is sent through the cable assembly 24 to the data acquisition unit 26 which is connected to the computer 27. This overall setup results in accurate measurement of fluid level changes to 0.00001" or better.

A second linear variable displacement transducer and float device 51 (FIG. 4) is used for direct and continuous measurement of the evaporation rate in the tank 30 and its piping. The unit 51 is like the unit 40 but is smaller; it may include a linear variable displacement transducer 52 combined with a float device 53 contained in an evaporation level monitoring tube 54. This measures continuously the liquid level 55 in the tube 54 and is located slightly above the liquid level 44 in the tank 30. The armature of the linear displacement transducer 52 is connected to the float 53 through a solid connecting rod 56, which moves vertically up or down with any corresponding liquid level change, and bleed openings are present. A temperature sensor 57 attached to the linear variable displacement transducer 52 monitors the temperature thereof. The transducer 52 converts the movement of the float 53 to an electrical output signal in volts. This voltage is proportional to the vertical movement of the float 53. The electrical output signal is then sent through the cable assembly 24 to the data acquisition unit 26 and from there to the computer 27. The evaporation liquid level changes are also measured to an accuracy at least 0.00001 inch, although sometimes an accuracy to 0.1 may be sufficient. The change in the liquid level 55 from this part of the unit 51 corresponds to the change in the liquid level 44 due to evaporation only for the liquid in the tank 30 and in the fill pipe 23.

The linear variable displacement transducer and float device 51 may be the same structure as the device 40 used for measurement of fluid level. The transducer 52 is changed to have displacements ranging from 0.005 inches to 0.05 inches. The accuracy of the level measurement is improved by a factor of about ten or better relative to the LVDT 40.

The assembly 21 also includes a pressure transducer and probe device 60 (FIGS. 4 and 7) for liquid level measurement by a calculation based on pressure and specific gravity of the liquid. The pressure transducer 60, with a full scale range of typically 0.5 p.s.i., is used to measure continuously the pressure of the liquid 31 for determination of the liquid level 44 and liquid level variation. The lowest range pressure transducer that can measure the pressure and not be damaged by excessive pressure, is used in order to optimize pressure measurement accuracy. A pressure transducer 61 has a sensing face 62 located above the liquid and connected to a hollow pressure monitoring tube 63 through an adaptor. The bottom end 64 of the tube which is placed at a fixed location in the liquid 31. The pressure transducer 61 measures the pressure difference between the bottom end 64 of the hollow tube 63 and the sensing face 62 of the pressure sensing transducer 61. The pressure transducer 61 then converts the sensed pressure to an electrical output signal in volts, which is proportional to the pressure and is sent via the cable 24 and the data acquisition unit 26 to the computer 27. A temperature sensor 65 is attached to the pressure sensor housing. The pressure transducer 60 also may contain a reference port to the atmosphere for differential pressure; instead of the transducer 66 about to be described.

The instrumentation assembly 21 also includes a pressure transducer 66 for atmospheric pressure measurement. The atmospheric pressure is measured by using the transducer 66 at the top of a pressure monitoring housing 67. A sensing surface 68 of the pressure transducer 66 is so located as to face 180° from the sensing face 62 of the pressure transducer 60. The measurements from the transducer 66 are then converted to voltage and sent to the computer 27 via the cable 24 and unit 26. The instrumentation assembly 21 also includes a temperature sensor 69 for ambient air temperature measurement. Accuracy of 0.00005 p.s.i. or better can be obtained, but often an accuracy of 0.005 p.s.i. is sufficient.

There is also an assembly 70 of a plurality of temperature sensors and probes (FIGS. 4-6), with its upper end in a tube 71 and with a sensor array 72 extending down into the liquid 31, for temperature measurements in the tank liquid. All its sensors 73 are connected to the cable assembly 24 for ultimate reporting to the computer 27.

Temperature measurement in the unit 70, as well as in the sensors 50, 57, and 65, is preferably accomplished using thermistors like those manufactured by Yellow Springs Instrument Company. The thermistors may be model 46041 glass-encapsulated thermistors with a 10,000 ohm resistance. Glass-encapsulated thermistors are preferred because of their excellent temperature stability. Other thermistor types, such as the model 44031 may be used. Still other types of temperature sensors can be used; these are generally of lower accuracy and price. For example, thermocouples, platinum thin film registers, can be used but would not be of sufficient accuracy when used in large volume tanks.

The temperature thermistors 73 are installed in either a single sensor array 72 with up to twelve sensors 73 on a single cable 74 with up to forty-eight conductors, or in up to twelve individual cables with a four conductors per cable. The multiple thermistor sensor array cable 74 used may be a neoprene or nylon outer jacket cable with braided or solid inner multiconductors up to forty-eight. The thermistors 73 are installed in individual conductors in the cable using a four wire ohm resistance measurement configuration 75 for optimum signal to noise ratio. A two-wire resistance configuration can be used; however, that method would result in less accurate measurement and is generally not used unless there is a limitation in the data acquisition channels available or conductors in a cable.

Liquid temperature in the tank, liquid temperature in the piping, and air temperature are measured. The sensors 73 installed in the array 72 is lowered into the center of the tank 30. The thermistors 73 are located at known distances from the bottom of the tank 30 to the top of the piping on the tank (e.g., the fill pipe 23) and into the test pipe 22. In manifolded tanks, the temperature sensors may be installed in both tanks in a similar manner.

Temperatures are measured to provide temperatures at known vertical locations in the tank, piping and air. From these average temperatures in the tank, piping, and air are obtained, or, better, an integrated weighted temperature related to segmental liquid volumes.

The thermistors 73 are preferably installed in the neoprene insulated cable 74 and have a thin covering 76 or for some cases are exposed directly to the liquid 31. The temperature time response ranges from a few seconds to a few minutes.

The temperature sensors 73 used are preferably glass-encapsulated thermistors with a resistance of 10,000 ohms each. Each thermistor 73 can resolve temperatures to better than 0.001° F. and can measure temperature changes better than 0.001° F. Each thermistor 73 is wired in its four wire configuration 75; with a constant current applied from the Hewlett Packard Model 3421A Data Acquisition Unit 26 there is a resolution of better than 0.1 ohms. This results in a resolution of 0.001° F. and it can measure temperature changes to better than 0.001° F. Accuracies of 0.0001° F. are feasible. These temperature changes and resolutions have been verified on numerous underground tank leak tests for clients using a product of this invention.

Using the described configuration can result in improvements in the accuracy of the temperature measured by as much as 5 to 100 percent. For example, for a 10,000 gallon tank filled with gasoline at 70° F. with a 0.01° F. temperature change could result in an error of from 0.005° F. to 0.01° F. or a volume error of 0.034 to 0.068 gallons per hour over a one hour period.

The strata in the liquid 31 from the bottom of the tank 30 to the top vary in temperature, so that errors can be made by not taking into account the temperature differences from the bottom to the top of the tank. Additionally, depending upon the location of the sensors 73 in the tank 30, the temperature sensor could be accounting for only a small volume in the tank 30 instead of the total volume in the tank 30, and thereby cause significant error. For example, if a single temperature sensor is one foot from the bottom of an 8,000 gallon tank it could result in as much as a 30 percent too low a volume change for a temperature change, if its temperature reading were used as the overall temperature for the tank. Likewise, if a single temperature sensor were in the center of the tank and were used to represent the temperature for the whole tank, the volume changes could be as much as 20 percent too high. This invention, however, solves this problem by putting the vertical temperature sensor array 72 from the top to the bottom of the tank 30. The underground storage tank 30 is treated as broken down into up to ten segments in the computer program. The volume around each thermistor 73 is used to determine the proportion of the volume of the tank 30 that is measured by each thermistor 73. The computer program automatically changes the volume around each thermistor 73 of the one to twelve thermistors installed in the tank 30 vertically from the top to the bottom.

As shown in FIG. 20, a modified form of temperature cable 120 may have a chain 121 (typically 10 inches in length) attached to the bottom 123 of the temperature cable. A weight 124 (which may be a two-pound standard fishing weight in a round ball configuration) attached to the bottom of the chain 121. This weight 124 and the chain 121 arrangement insures that the temperature cable 120 and the sensors 125 are at a fixed and known location in the tank 30. It also minimizes the cable movement, since the cable 120 is urged toward the bottom of the tank 30 by the weight 124.

Normally, the temperature sensors 125 of the cable 120 are 12, 30, 48, 66 and 84 inches from the bottom of the tank 30. The first temperature sensor 125 is about 1.5inches up from the bottom of the temperature cable. This results in equal spacing of the temperature sensors 125 in an eight foot diameter tank 30. The length of the chain 121 may be increased or decreased in order to center the temperature sensors 125 for other tank sizes, i.e., 4, 6, 10, 12 feet in diameter.

Figure 21:
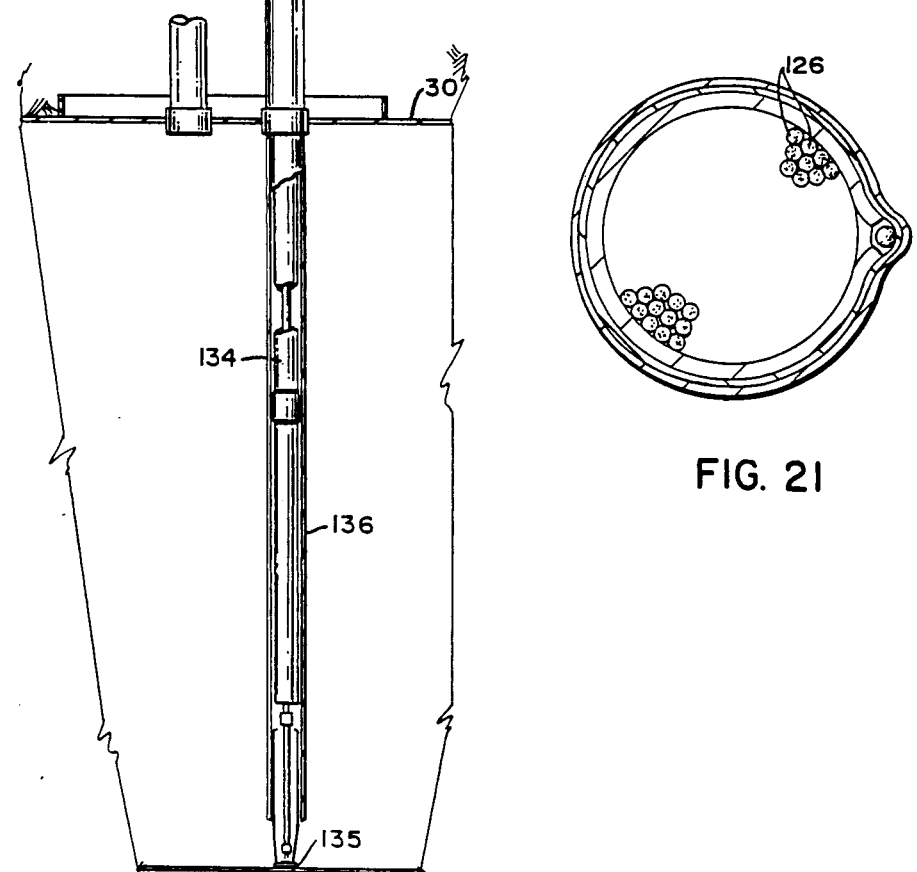
FIG. 21 is an enlarged view in section along the line 21—21 in FIG. 20.

The cable 125 may have a series of twisted two-cable members 126 (See FIGS. 21 and 22) of different lengths, each having a thermistor 127 for each sensor 125, each protected by shrink tubing 128.

Using the integrated thermistor technique, the accuracy of the temperature measurement is increased by as much as 30 percent of the true temperature when compared to measurements taken by a single temperature sensor in the center of the tank or a single temperature sensor installed at the bottom of the tank. As said, a single temperature sensor at the center of the tank reads approximately 10 to 30 percent higher than the actual overall temperature of the tank. A single temperature sensor at the bottom of the tank generally reads 10 to 30 percent lower than the actual overall temperature in the tank. An error of 30 percent in the tank temperature change of 0.01° F. during a one hour test in a 10,000 gallon tank with gasoline can result in a volume error of 0.0204 gallons per hour.

In certain cases the temperature obtained from the individual thermistors 73 are averaged and used in the tank temperature. Normally, the integration technique is used to provide the highest accuracy.

The output of the thermistors 73 is preferably sent to a Hewlett Packard Model 3421A Data Acquisition Control Unit 26 and then to the computer 27 (Hewlett Packard Model HP 85A or Model HP Model 9807) or equivalent computer.

Further, there is an hydrometer 77 (FIGS. 4 and 5) to measure the specific gravity of the tank liquid 31. The hydrometer 77 may be a part of the assembly 21 (for example, it may in a liquid fill line 78) or may be a separate element. The hydrometer 77 reading may be manually entered into the computer 27, since it is taken only once, or it may be transmitted to the computer 27 electronically. The specific gravity of gasoline, for example, is 0.735.

An inclinometer 79 (FIG. 4) measures the inclination angle of the tank fill pipe 23 or of the tank 30. It may be, for example, attached to the fill line 78. Inclination may be measured visually after the inclinometer 76 is placed on the top of the fill pipe 23; the inclination angle may be transmitted to the computer 27, either electronically or manually.

Figure 8:
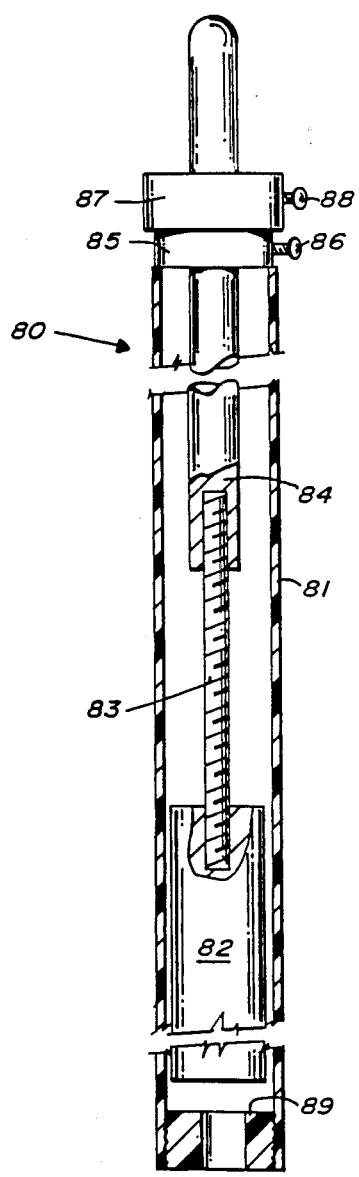
FIG. 8 is an enlarged view in elevation and partly in section of a preferred form of calibration rod and associated parts.

The proportion of volumetric displacement of the liquid 31 into the fill pipe 23 and into the other lines 33, 34, and 35 that are connected to the tank 30 may be determined by using a displacement calibrator 80 (FIGS. 4, 5, and 8) is installed in a displacement calibrator tube 81 forming part of the assembly 21. The displacement calibrator 80 includes a solid rod 82 for insertion into the liquid 31. A small threaded rod 83 connects the solid displacement rod 82 to a solid thin rod shaft 84. Attached to the shaft 84 is a hollow plastic spacer cylinder 85 with a set screw 86 for holding the shaft 84 at a fixed location. A second spacer cylinder 87 of larger wall thickness with a set screw 88 is used to eliminate loss at the rod 84. The unit 80 is dropped into the liquid 31. A small threaded plug 89 with a small hole is threaded into the bottom of the tube 81.

The test pipe extension tube 38 may be used to extend the tank fill pipe 23 upwards when the liquid level 44 must be raised to compensate for the static head of groundwater, when the groundwater level 37 is above the bottom of the tank 30, and to afford visibility of certain aspects of the test.

FIG. 3 shows four types of test pipe instrumentation tubes 22 that are examples of those that may be used to enable versatility and flexibility in fitting the different fill pipes found at the tank installations. FIG. 3 illustrates that each type of pipe instrumentation tube 22 has a different fitting to connect it to the tank fill pipe 23. FIG. 3A shows a type of tube 22a having a OPW 4"-60-AS steel quick disconnect coupling 90, FIG. 3B presents a type of tube 22b having a standard 3" IPS female threaded coupling 91. FIG. 3C shows a type having an OPW 60-TT 4" fitting 92 with a seal and a clamp having a lever 93, while FIG. 3D shows a PH Model F219 "elephant foot" type of coupling 94 with a lever 95. These various types of couplings, fitting seals, and clamps, or other types, illustrate the versatility of the device 20 in tightly and safely fitting the instrumentation tube 22 to the tank fill pipe 23. Each of the four types of test pipe instrumentation tube may be provided with a flanged four-inch nipple 96 immediately above the connector as described above, for attachment to a flange 97 of the instrument tube assembly 21. See FIGS. 1 and 2. A ¼-inch pressurization line 98 includes a check valve 98a and may be used in combination with a quarter inch drain line 98b connected to the tube 22. (It is shown only at 3A but applies also to 3B, 3C and 3D). The remainder of the test pipe instrumentation tube 22 is preferably a one to three foot length of Excelon-4000 or equivalent transparent rigid PVC pipe 23 fitted to the standard PVC 8-hole pipe flange 96.

Figure 2:
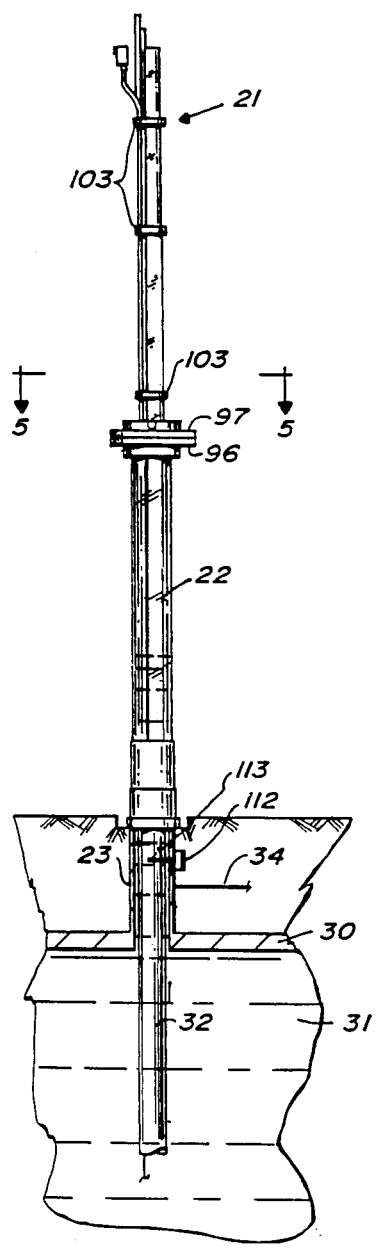
FIG. 2 is a view in elevation and partly in section of the tank portion in the area of the fill pipe and the instrumentation assembly of the invention, which contains sensors, a calibration device, a liquid level determining device, and temperature sensors.
Figure 3A:
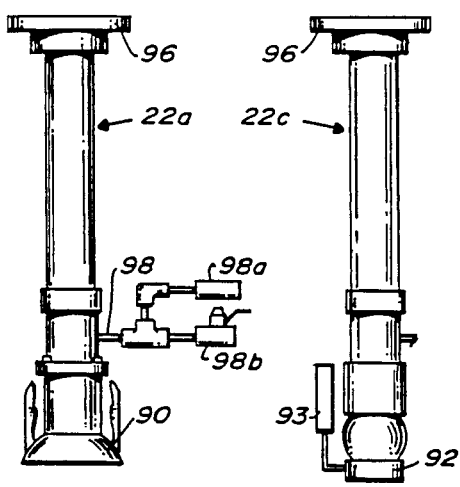
FIG. 3 is a set of views in elevation of various forms of test pipes and their different couplings for attachment to various forms of fill pipes. The different test pipe are shown in views 3A, 3B, 3C, and 3D.
Figure 3C:
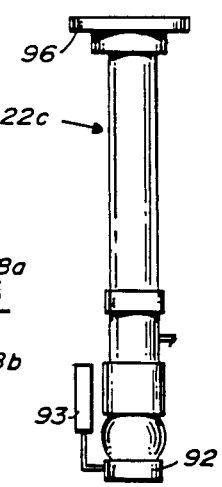
Figure 3B:
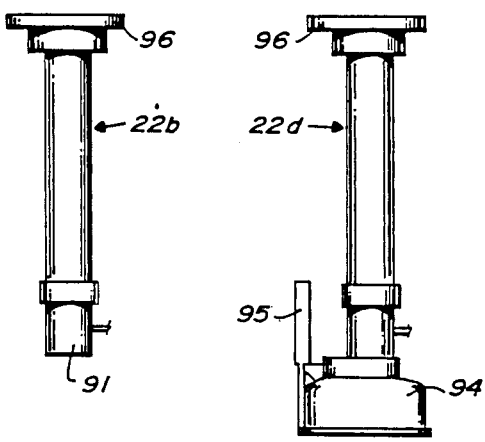
Figure 3D:
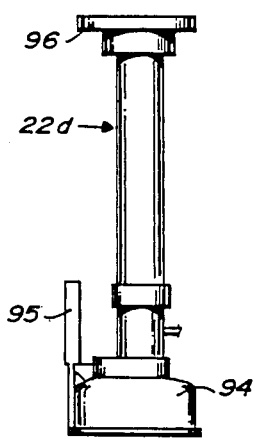

FIGS. 2 and 5 illustrate a preferred example of a test instrumentation assembly 21 of the invention, and FIG. 4 shows its six component test tubes 43, 54, 63, 71, 78, and 81. The test instrumentation assembly 21 is inserted into the test pipe extension tube 38, when that is used, as in FIG. 1, and affixed there to the tube by mating the flange 97 to a flange 99a.

The retaining flange 97 of the instrumentation assembly 21 may be a standard PVC 8-hole pipe flange that serves to hold a PVC pipe retaining ring 100 by means of three thumb set screws 101 (FIG. 5). Another thumb screw 102 mounted through the retaining ring 100 may be used to adjust the vertical position and secure the test tubes 43 etc. to the retaining ring 100 and its flange 97. Transparent pipe holder sleeves 103 (FIGS. 1 and 3) bind the six test tubes 43, 54, 63, 71, 78, and 81 together mechanically at several vertical positions. Adjustment of the vertical position of the test instrument assembly 21 by means of the thumbscrew 102 is an important adjustment for each individual test site.

The extension tube 38 is attached to the tube 22 by its flange 99 being attached to the flange 96.

As stated earlier groundwater sometimes causes problems. As shown in FIG. 1, a groundwater test hole or monitoring well 110 is drilled with a small-diameter steel rod, about ½" diameter and about 6' long, extensions being added as needed, usually smaller in diameter, to reach a depth of perhaps twenty feet. Alternatively, a pipe may be hammered into the soil for permanent monitoring of the groundwater depth. A probe 111 may be used to find the groundwater's upper level and the depth relative to the bottom of the tank. With that known, pipe extensions 38 may be used as needed and as described above. The groundwater depth is also entered into the computer 27.

The temperature of the tank wall may be measured by a thermistor 112 affixed to the fill pipe 23 with a cable 113 leading through the test pipe 22 and on to the assembly 21 (FIG. 2).

As shown in FIG. 1., there is a digital monitor unit 115 such as a sensitive voltmeter, preferably accurate to at least four digits, to enable manual recording of the data, in case for some reason or computer 27 or the unit 26 should become inoperative or have faults. Then data obtained from the digital monitor 115 can be put in manually to another computer (or the computer 27 when repaired) for automatic processing. Manual processing is also possible though not necessary.

Figure 12:
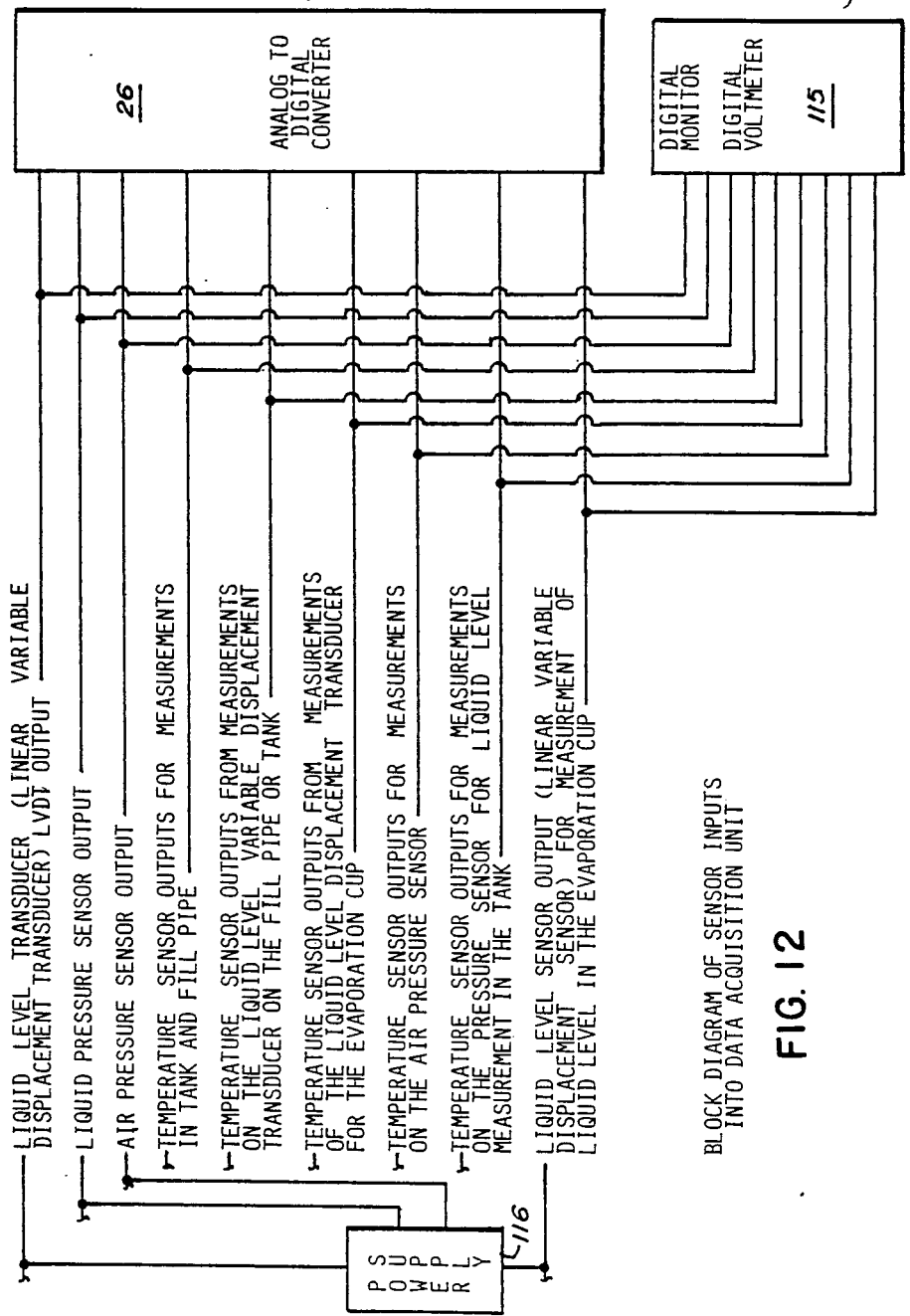
FIG. 12 is a block diagram of the sensor inputs into the data acquisition unit.
Figure 13:
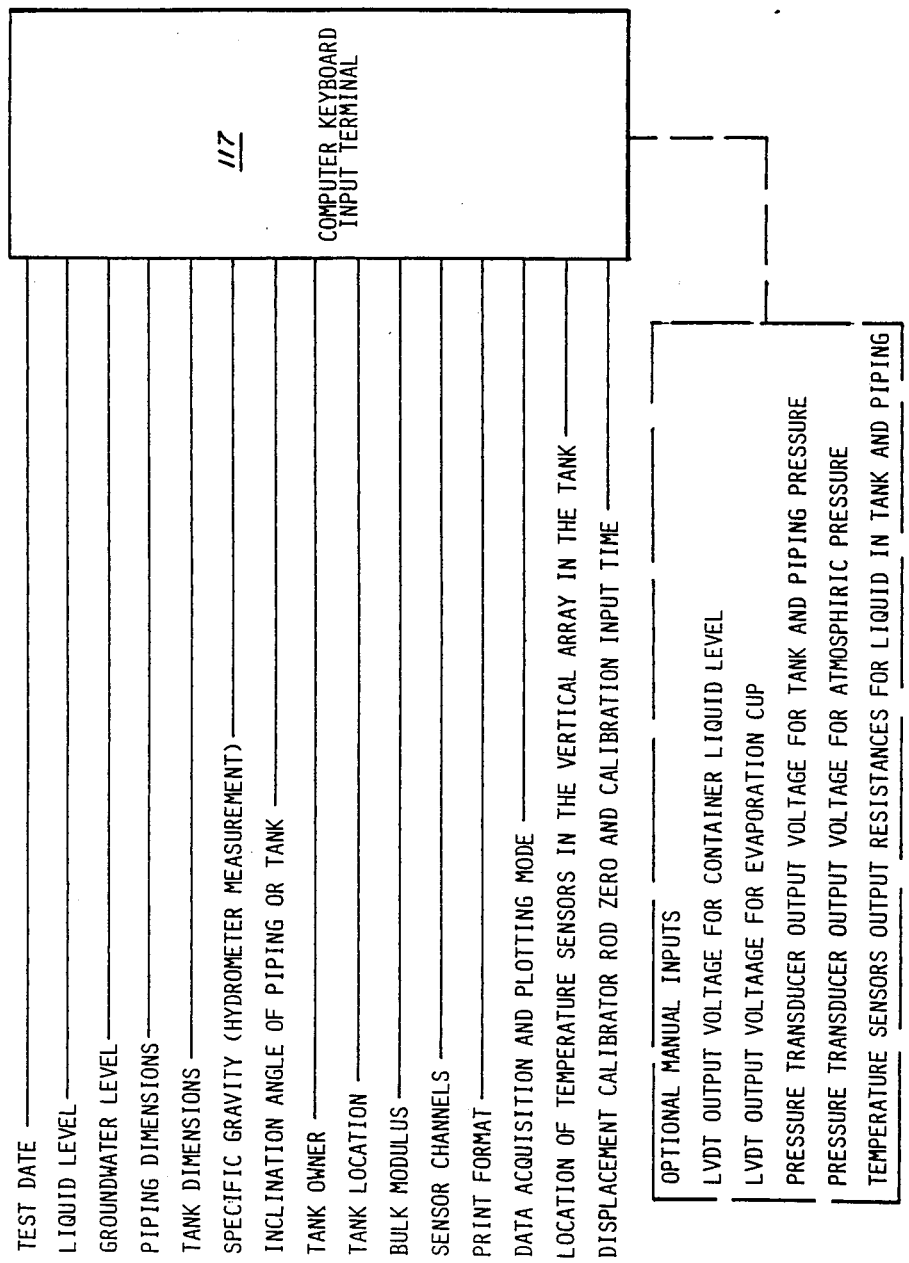
FIG. 13 is a block diagram of the computer keyboard input functions.
Figure 14:
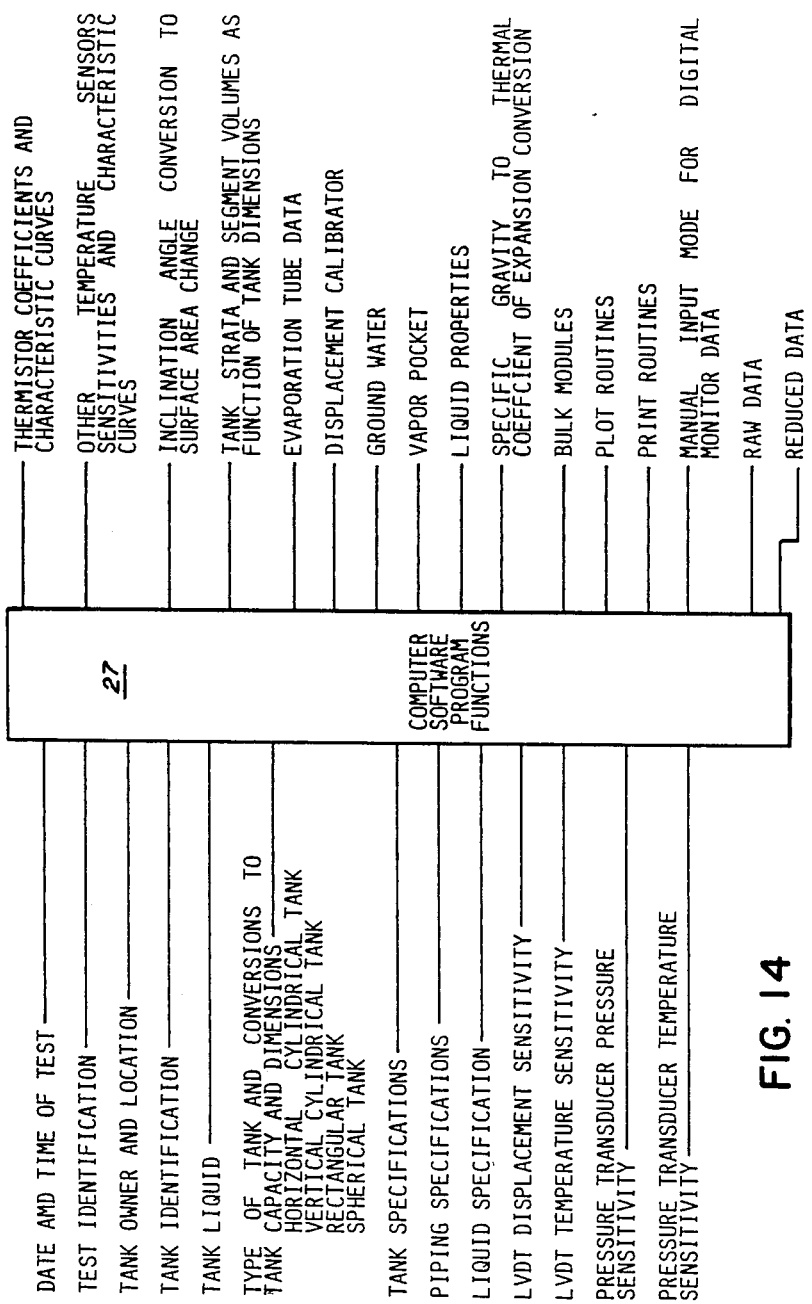
FIG. 14 is a block diagram of the computer program software.
Figure 15:
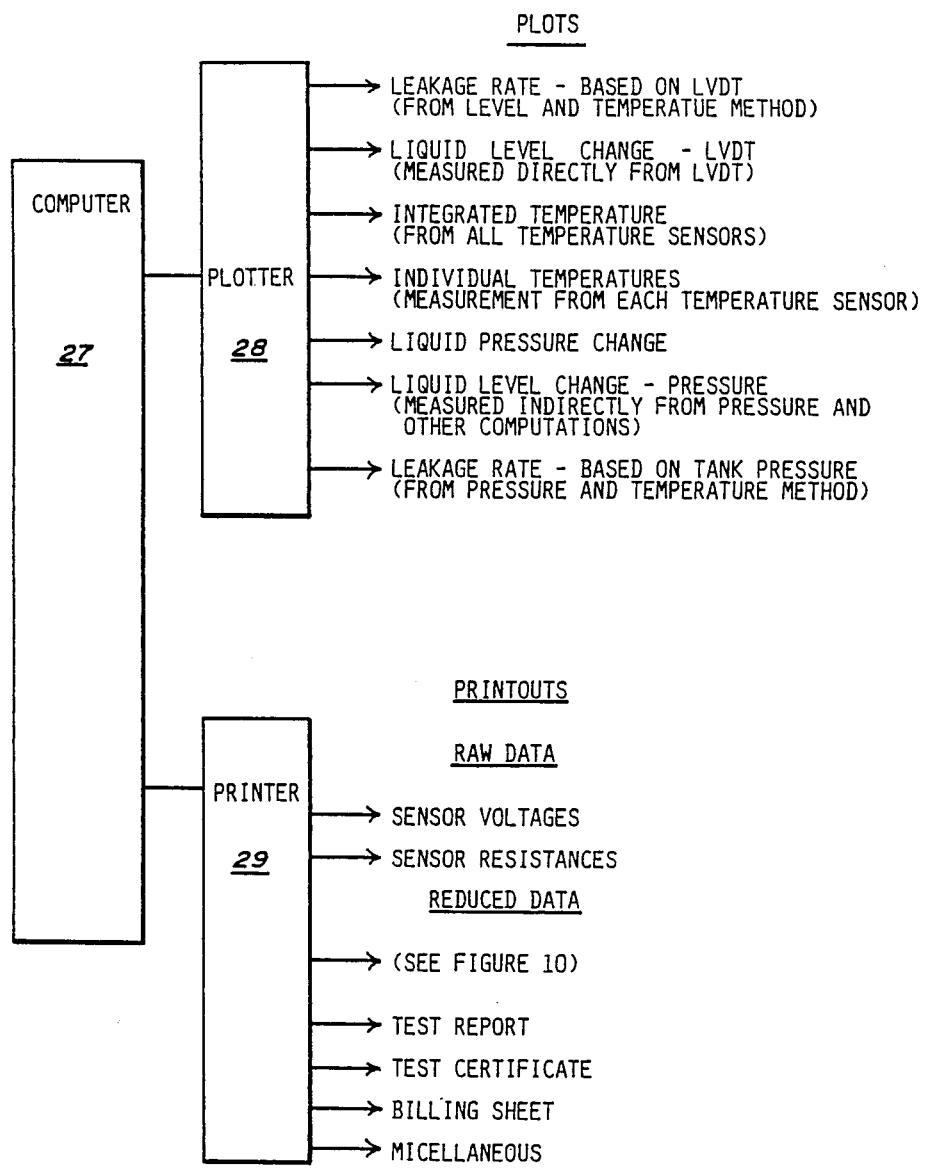
FIG. 15 is a block diagram of the computer printout functions and displays.

FIG. 12 shows a power supply 116 for the sensors etc.

DATA ACQUISITION AND PROCESSING SYSTEM

Computerized conversion of measurements to leakage rate and corrected leakage rate with printout of data and plots (See FIGS. 10-18)

The following general operations in the computer software and computer controlled data acquisition unit are used to obtain the leakage rate and other tank information, which are typically printed out and plotted as in FIG. 10A-G and includes:

1. Tank owner name
2. Tank number or other identification
3. Measurement number (n) is identified
4. Date of test
5. Tank temperature
6. The tank temperature T (n) in degrees Fahrenheit that results from volume integration of temperature measurement T(ni) segments of the individual volume tank strate S(t).
7. The pressure of the tank liquid P(tf) in psi at a fixed location a few inches below the top of the liquid 31 in the piping above the tank or in the tank.
8. Atmospheric pressure in psia measured a few inches above the level of the tank liquid.
9. The total initial volume V(ri) of the reference tank and piping V(r) in gallons. This is computed based upon known dimensions of the tank and piping, or the total measured liquid volume used to fill the tank and piping to the height of the liquid level measurement.
10. The temperature correction volume V(tc) to the tank liquid volume, in gallons, due to change in temperatures measured in the tank liquid. This volume correction due to changes in strata temperature is computed by summing the products of the strata volume V(i), the coefficient of expansion E(c) of the liquid 31, and individual temperature change T(ci) at each level of measurement. This correction is calculated from a reference time t(r) of measuring strata temperatures and uses a temperature basis of 60° F., where $$V_{(tc)} = V_{(i)} \times E_{(cc)} \times T_{(c)}.$$

The following additional information specified the comprehensiveness of the correction:

(a) The temperature coefficient of expansion of petroleum products CE(p) for the total liquid under test is obtained by: measuring the specific gravity of the tank liquid SGMF, and entering the computerized tables for petroleum products for the temperature coefficient of expansion and specific gravity SGMF.

(b) The temperature coefficient of expansion of other liquids CE(f) is obtained by automated retrieval from computer tables of known coefficients of expansion, by specifying the particular liquid under test.

(c) The overall temperature correction T(ct) for the tank liquid is computed by summing the product of individually measured strata temperature changes T(is) and the fractional volume of each strata as determined from the temperature sensor location.

The temperature coefficient of expansion of the liquid Ce is related to the total volume change in a tank from $$V_c = C_e \times V \times T_c$$

where
$V_c$ = volume change in the fluid in the tank and piping
$V$ = volume of the fluid in the tank and piping
$T_c$ = temperature change of the liquid.

Hence, an error in the coefficient of expansion $EC_e$ results in a corresponding error in the volume change. For example, if the temperature coefficient of expansion is in error by 10 percent, the volume change would be in error by 10 percent.

The invention corrects for this in two ways. First the temperature coefficient of expansion for all liquids is placed in a table in the computer memory for all liquids. In addition, the computer 27 stores the relationship of the temperature coefficient of expansion and specific gravity from American Petroleum Institute Tables for petroleum products. For a petroleum product, the specific gravity of the liquid is measured using a hydrometer 77 and the results manually entered into the computer 27. The computer 27 then converts this measurement to the precise specific gravity of the liquid. Earlier methods do not use a computer conversion but require manual conversion of the specific gravity measurement to coefficient of expansion. Additionally, other earlier methods merely use a single value for specific gravity of gasolines, oils and crude.

(d) The temperature correction T(cp) for the liquid in tank piping is the product of temperatures measured in the tank piping, T(p), and the liquid volume in the tank piping VTP, divided by the overall liquid volume.

(e) The overall temperature correction T(c) is sum of T(ce) that for the liquid in the tank and that for the piping $T_{(cp)}$.

(f) The liquid volume in the tank piping VTP is calculated by summing the products of each separate piping length and the respective cross-sectional areas, i.e., those of the fuel line SA(FL), the vapor recovery line SA(vr), the vent line SA(vl), and any other piping, as obtained by use of the calibration results of the volumetric displacement calibrator.

11. The pressure correction to tank liquid V(pc) is based upon the measured change in atmospheric pressure P(ca), tank pressure P(ct) and the bulk modulus of the liquid.

12. The corrected volume V(co) is the sum of the initial reference volume V(i), the temperature correction V(tc), and the pressure correction V(pc).

13. The corrected reference volume change V(cr) is obtained by subtracting reference tank volume V(ri) from the corrected volume V(co).

14. The expected level change L(e) is obtained from the corrected reference volume change V(cr) divided by the corrected cross-sectional surface area of the riser piping SA(CRP) or by the corrected tank liquid surface area SA(ctf) if the test is made in the tank.

The expected level change L(e) is then a function of the tank and piping geometry, i.e., the tank size, tank shape, fill pipe dimensions, piping and tank inclination, cross-sectional area of other piping, dimensions of the test apparatus installed in the tank, and volume changes due to the major significant correctiona factors, including volume change due to temperature and pressure.

If the liquid level is in the fill pipe, the expected level change L(t) is computed by the volume of the corresponding fill pipe cylinder.

$$V_{cyl} = \frac{\pi}{4} d^2 (l_2 - l_1)$$

$$L(t) = l_2 - l_1 = \frac{4 \times V_{cyl}}{\pi d^2}$$

where:
d = fill pipe inner diameter
$l_2$ = final level change
$l_1$ = initial or reference level.

If the tank is an open rectangular tank, then the expected level change is the expected volume change divided by the surface area of the tank.

$$V_{rec\text{-}tank} = (l_2 - l_1) \times A_s$$

$$L(t) = l_2 - l_1 - V_{rec\text{-}tank}/A_s$$

If the tank is a horizontal cylindrical tank and the liquid level is internal to the tank (below the fill pipe), the expected liquid level change is computed by finding the cross-sectional area required for the initial and final volume and then solving the equation:

$$A = R^2 \cos^{-1}\left[\frac{R - h}{R}\right] - (R - h)\sqrt{2RH - h^2}$$

where R is the radius of a cross-section of the tank at height h above the bottom of the tank, to obtain the required h or level change within 0.0001 gallons.

The corrected cross-sectional surface area of the riser piping SA(crp) is obtained by measuring the cross-sectional area of riser piping SA(rp), correcting as follows:

(a) The inclination angle of the piping IA(rp), based on the measurement of the angle of the piping off the centerline and the resultant reduction in cross-sectional surface area.

(b) The cross-sectional surface area of the instrumentation tubing SA(it) and instruments in the liquid in inches is subtracted from SA(rp) if the volumetric displacement calibration is not used.

(c) Additional cross-sectional area: the cross-sectional area of other piping, including the fuel line piping SA(fl), the vapor recovery line piping SA(vr), the vent line piping SA(vl), and that of any other piping as determined by using the volumetric displacement calibrator calibration SA(vdc). The resultant liquid level increase in inches for a known volume inserted in the piping is compared with the expected level change for the fill pipe only. Multiplying the ratio of the expected level change and the measured level change by the piping cross-sectional area of the piping in the riser, with the instrumentation tube assembly 21 installed, the total cross-sectional area of all the piping is determined.

15. The measured liquid level change L(m) in inches is obtained in two ways:
(a) The linear variable displacement measurement sensor LVDT measurement of the direct liquid level change L(di) in inches.
(b) The indirect measurement of the liquid level change L(i) in inches from the measurement of the fluid pressure P(tf), atmospheric pressure measurement P(a), using the specific gravity of the liquid SGMF manually measured prior to the start of the test.

16. The total liquid level L(tf) in the tank in inches is the sum of the initial liquid level measured, using a tape inserted in the tank at the time of the reference measurement L(tr) and the measured liquid level change L(m).

17. The apparent leakage L(a) in gallons is computed based on the difference of the volume corrected change V(cr) and the volume measured V(m) where: the volume measured V(m) in gallons is the product of the liquid level change L(m) and the cross-sectional area of the riser piping SA(rp).

18. The elapsed time EL in minutes is the time between the initial reference time T(r) in minutes and the time at measurement n.

19. The apparent leakage rate LR(a) in gallons per hour is computed by dividing the apparent leakage L(a) by the lapsed time EL.

20. The corrected leakage rate LR(c) in gallons per hour is obtained by summing the apparent leakage rate LR(a) and the following corrections:

The evaporation leakage rate LRE(c), obtained by measuring the liquid level drop in the evaporation tube 53 in two ways. First, manually reading the volumetric change on the calibrated volume scale at the end of a test. Second, continually measuring and computing the evaporation rate, using the linear variable displacement transducer 51 installed in the cylindrical evaporation tube 53 to measure level drop in a tube of known cross-sectional area.

Figure 10A:
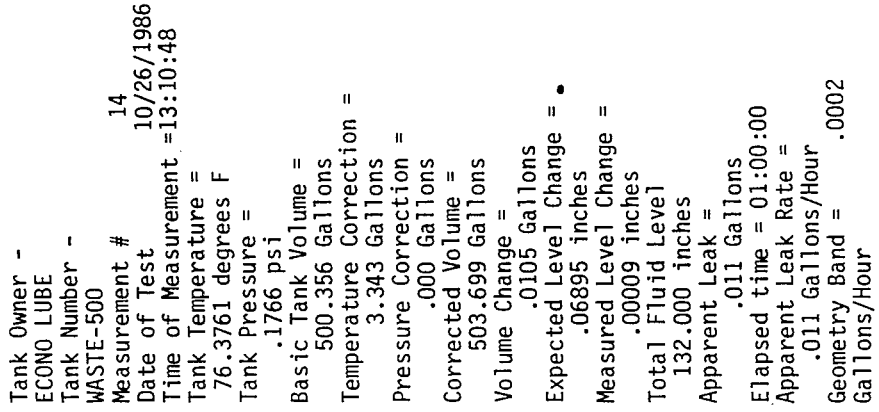
Figure 10D:
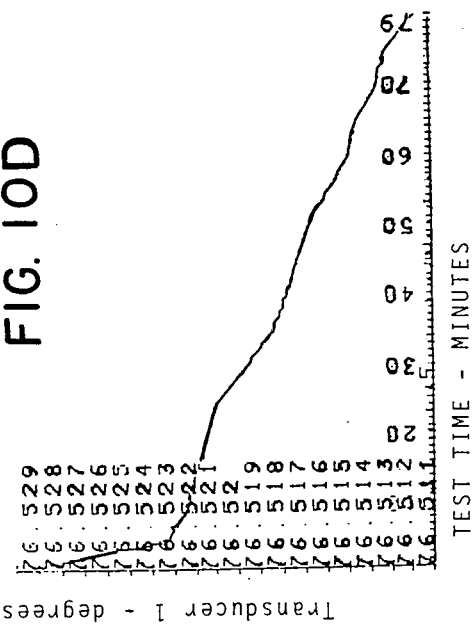
Figure 10E:
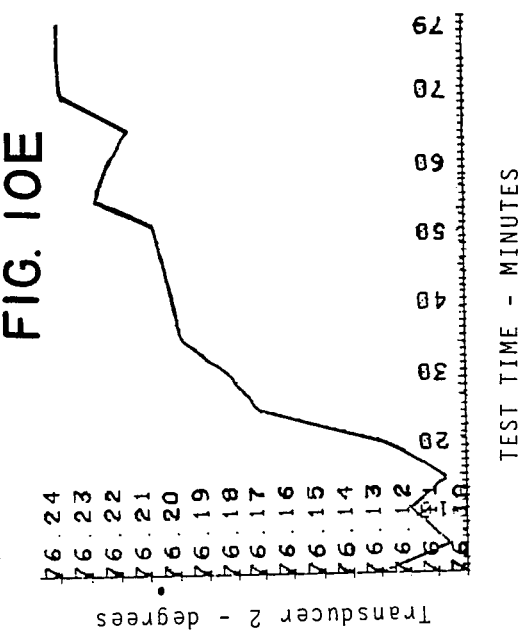

As FIG. 19 shows, the printout shown in FIG. 10A may be supplemented by printing out the additional factors and their values. The values resulting from one test are shown in FIG. 19.

The factors may be identified as follows:

Secondary Expected Level Change is the expected level change using the tank pressure from Measurement of the apparent leak rate and the pressure correction. Secondary Apparent Leak is the difference between the expected level change and the measured secondary level change times the calibration factor of gallons- /inch. Secondary Apparent Leak Rate is the secondary apparently leak divided by the elapsed time. Stratified Expected Level Change is the expected level change computed for the total volume change added for each individual temperature sensor for a specific volume of the tank. Stratified Apparent Leak is the difference between the expected stratified level change and the measured level change times the calibration factor of gallons/inch for the primary leak rates. Stratified Apparent Leak Rate is the stratified apparent leak divided by the elapsed time. The other factors pointed out are self explanatory.

21. Other corrections: the error bands printed out for leakage rate determination, as discussed earlier, including especially:
  (a) The error for unknown volume in the tank and the tank geometry is computed by multiplying the average error of the tank volume ETV, assumed at ±2% of the nominal tank volume, by the cofficient of expansion of the liquid CE times the average temperature change ATC over the time from reference time to the time for the data sample n. If the error for unknown volume is significant, i.e., greater than 0.01 gallons per hour, the computer system continues taking data until the unknown volume error becomes insignificant, i.e., less than 0.005 gallons per hour.
  (b) The error band for coefficient of expansion ECE.
  (c) The error band for instrumentation errors EIE.
  (d) The error band for temperature measurement ET.
  (e) The error band for specific gravity measurement ESG.

22. Computer plots are provided continuously for visually observing the liquid leakage rate results and other data for interpretation of the results. Typical plots are included in FIG. 10 for:
  (a) Leakage rate and time based on liquid level, using the LVDT sensor and the temperature and other measurements.
  (b) Detailed leakage rate and time, based on liquid level measurement using the LVD sensor, temperature measurement, and other measurements.
  (c) Liquid level and time, based on linear variable placement sensor output.
  (d) Integrated temperature of strata.
  (e) Temperature output for each sensor.
  (f) Pressure of liquid.
  (g) Air pressure.
  (h) Leakage rate and time based on liquid air pressure measurements, temperature measurements and other measurements.
  (i) Detailed leakage rate and time based on liquid and air pressure measurement, temperature measurement and other measurements.
  (j) Liquid level based on pressure measurements and the specific gravity of the liquid.

Figure 18:
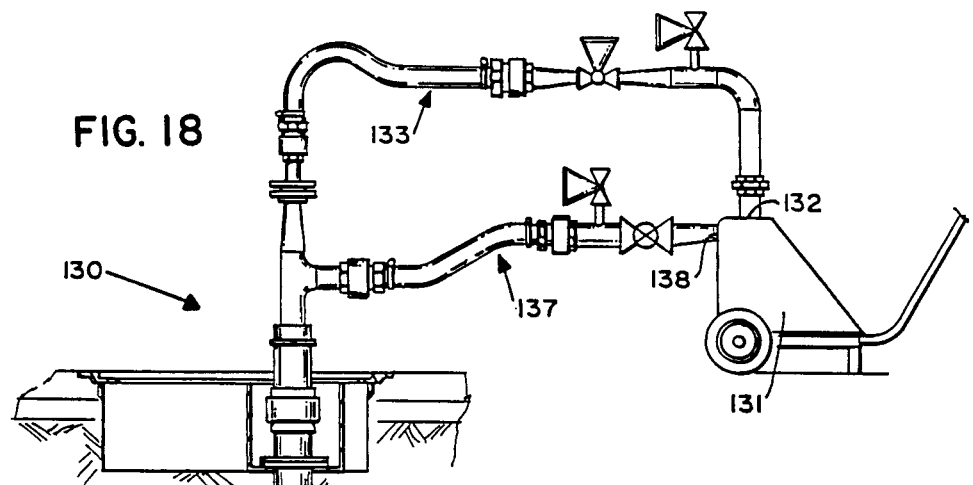
FIG. 18 is a fragmentary view in elevation and partly in section of an underground liquid storage tank and a circulation system for mixing the liquid present in the tank with liquid being added at a different temperature, so that the temperature differences are kept from producing significant erros in computations.

FIG. 18 shows a circulation system 130 for a four inch fill pipe. A similar device is also provided for a two inch fill pipe. Circulation of the liquid in the tank 30 is normally done immediately after the tank 30 is filled with liquid at a temperature different from that of the liquid already in the tank 30, as from a tank truck. Circulation is used to speed up the stabilization time that is normally required before the tank temperature changes are suitable for providing an accurate test. Normally, the temperature changes in a tank 30 must be less than 0.1° F. per hour before the tank 30 can be tested. Without circulation, a tank 30 normally requires 8 to 12 hours stabilization time after being filled from a tank truck before the tank 30 achieves stabilization. In contrast, circulation of the fluid requires only 45 minutes to a maximum of two hours and thus speeds up the test time by 6 to 11 hours.

The circulation system 130 includes a pump 131 with a throughput of from 20 to 50 gallons per minute to discharge liquid through a discharge output 132 of the pump 131 and then through a hose 133 and piping 134 configuration with the orifice 135 of the pipe 134 at the bottom of the tank 30. The orifice 135 of the pipe 134 disperses the liquid to cause a mixing effect of the liquid in the tank 30. A suction tube 136 is installed in the top part of the tank 30, and liquid is then suctioned back through a pipe and hose configuration 137 into the suction input 138 of the pump 131. Liquid is then circulated until the temperature changes in the tank 30 vary less than 0.1° F. and the temperature differential from the bottom to the top of the tank 30 is less than 1° F. To achieve this temperature profile in a tank, the liquid is circulated from 45 minutes to 2 hours depending primarily on the volume of the tank 30 and to a lesser extent on the volume in the tank 30 and the liquid volume added to the tank 30 to fill the tank.

Once the temperatures are stabilized, the circulation of the liquid in the tank is stopped, and the testing is started. The circulation is stopped so that the liquid in the tank 30 is stable, based on both temperature changes and liquid movement.

Corrections

The volumetric method of determining the leak rate in a tank with piping measures the change in volume due to leakage and corrects for the other factors that affect the volume, using the following relationship:

$$Vt(\text{tank and piping}) = (Va - Vc)/t$$

where
  Vt = true or actual leakage rate
  Va = apparent leakage rate
  Vc = volume of corrections
  t = time period between measurements in hours.

If there were no correction factors or Vc=0, Vt would be equal to Va, or the true leakage rate would be equal to the apparent leakage rate.

In this simple case above, a simple measurement of the vertical level change in the fill pipe 23 (of known diameter) and simple mathematical calculations are all that is necessary to determine the apparent leakage rate in an underground storage tank 30 that is completely filled to the fill pipe level at grade level. Volume lost or gained is computed by multiplying the level change Lc times the cross sectional area of the inside diameter of the fill pipe Pcsa (3.1416 × diameter of the pipe) times the density of the fluid. (If the tank is only partially filled, the cross sectional area is that of the surface area in the tank) or $$Vt = Lc \times Pcsa. \tag{2}$$

Hence, performing a test to determine that a tank does not leak more than the government legal limit of 0.05 gallons per hour (or about 1 gallon per day of hazardous material loss) might appear to be quite simple.

However, due to actual tank operation and environmental and external conditions, numerous effects or factors result in significant differences between the true and the apparent leakage rate. This invention corrects for the most significant errors, as noted earlier, resulting in a system that is extremely accurate and capable of detecting leak at the rate of 0.005 gallons per hour or better.

Only a few of these errors have been corrected for by the prior-art tank testing systems, with the result that these other tank testing system have inherent major errors. This results in extremely inaccurate tests by these other systems; the tests indicate leaks that do not really exist, or leaks that exist are not found. This causes either unnecessary downtime and other costs or costly environmental problems due to the inability to determine that a tank is leaking.

An error analysis performed as parts of this invention shows that the apparent leakage rate measurement can be in error by as much as 10 to 100 times greater than the true or actual leakage rate. (This could result in up to about 100 gallons per day leakage going undetected due to an inaccurate tank leak test.)

An example of just one of these errors demonstrates this error problem. If, for example, the temperature measurement of the fluid is in error by only 0.01° F. in one hour, the leakage rate error would be 0.068 gallons per hour due to temperature. For the same temperature measurement error in a 50,000 gallon tank, the leakage rate error would be 0.34 gallons per hour. An error of this magnitude could result in 8.16 gallons per day of hazardous fluids going undetected.

One of the main features of this invention is that the apparatus, computer software, and procedures result in the correction of these most significant errors that affect the apparent leakage rate. This results in test apparatus that has an extremely accurate leakage rate capability, an accuracy of approximately 0.001 gallons per hour, which is as much as 1000 times more accurate than other measurement methods in common use.

FIG. 16 illustrates the correction factors and the system measurement combinations. The correction and means for obtaining the correction for each of several typical individual errors is described separately below.

Correction Details

The temperature measurement techniques use temperature integration and average temperatures from the bottom to the top of the tank.

The underground storage tank 30 is treated as up to ten segments in the computer program. The volume around each thermistor 73 is used to determine the proportion of the volume of tank 30 that is measured by each thermistor 73. The computer program automatically changes the volume around each thermistor 73 for from one to twelve thermistors installed in the vertically from top to bottom in the tank.

Using the integrated thermistor technique, the accuracy of the temperature measurement is increased by as much as thirty percent of the true temperature when compared to measurements taken by a single temperature sensor in the center of the tank or a single temperature sensor installed at the bottom of the tank. A single temperature sensor at the center of the tank reads approximately 10 to 30 percent higher than the actual overall temperature of the tank. A single temperature sensor at the bottom of the tank generally reads 10 to 30 percent lower than the actual overall temperature in the tank. An error of 30 percent in measurement of the tank temperature change of 0.01° F. during a one hour test in a 10,000 gallon tank with gasoline can result in a volume error of 0.0204 gallons per hour.

In certain cases the temperatures obtained from the individual thermistors are averaged and used as the tank temperature. Normally, an integration technique is used in the computer to provide the highest accuracy.

The system as so far described requires the use of manual inputs into the computer during a periodic precision test. Continuous monitoring, on the other hand, does not require manual inputs and provides testing for leakage continuously. The basic difference is that for the periodic precision tank test, there are entries into the computer terminal before each test while the continuous monitoring system does not require manual inputs. However, the system as provided in the patent can be used as a crude continuous monitoring system.

To those skilled in the art to which this invention relates, many changes in construction and widely differing embodiments and applications of the invention will suggest themselves without departing from the spirit and scope of the invention. The disclosures and the descriptions herein are purely illustrative and are not intended to be in any sense limiting.

What is claimed is:

1. A method for detecting and measuring leaks in an underground container such as a tank and piping containing a liquid, comprising:
   measuring the pressure and temperature of the liquid over a predetermining time interval,
   simultaneously measuring the liquid level in the container and the temperature of the liquid therein over the same predetermined time interval,
   calculating from each said measuring step the leak rate of the liquid from said container, and
   comparing the two calculated leak rates with each other.

2. The method of claim 1 wherein each of the two simultaneous measuring steps include measuring the temperature at a series of different depths in said container.

3. The method of claim 2 wherein the pressure and the liquid level are measured at respective loci; including measuring the temperature also at the locus where the pressure is measured and at the locus where the liquid level is measured and including those measurements in said calculating steps.

4. The method of claim 1 including determining the specific gravity of the liquid and including it in said calculating step.

5. Apparatus for detecting and measuring leaks in an underground container, such as a tank or piping containing a liquid, comprising:
   pressure sensing means for measuring the pressure of the liquid over a predetermined time interval,
   first temperature sensing means for simultaneously measuring the temperature of said liquid over said time interval,
   second temperature sensing means for simultaneously sensing the ambient temperature over said time interval, and
   level sensing means for simultaneously measuring the level of the liquid in the container over said time interval.

6. Apparatus according to claim 5 having
   computer means for calculating from data obtained from all of said means the leak rate of the liquid from said container.

7. The apparatus of claim 6 having third temperature sensing means for simultaneously measuring the temperature of said pressure sensing means over said predetermined time interval, fourth temperature sensing means for simultaneously measuring the temperature of said level sensing means over said predetermined interval, and means for supplying said temperature sensed by said third and fourth means to said computer means.

8. The apparatus of claim 6 having hydrometer means for measuring the specific gravity of said liquid for use by said computer means.

9. The apparatus of claim 5 wherein said container includes a fill pipe at its upper end and inclinometer means for measuring the inclination of said fill pipe and container for use by said computer means.

10. Apparatus according to claim 5 having digital monitoring means for manual recovery of the data from each of said means.

11. The apparatus of claim 5 wherein first temperature sensing means comprises a series of thermistors located at different depths in said container.

12. The apparatus of claim 11 wherein the series of thermistors are located at spaced intervals along a cable and weight secured to the bottom of said cable.

13. Apparatus for detecting and measuring leaks from an underground tank having a fill pipe at an upper end thereof and having other pipes connected thereto, and containing a liquid that extends up into said fill pipe, comprising:

a test instrumentation assembly of test elements, conductor means attached to the elements of said test instrumentation assembly, data acquisition means connected to said conductor means, digital computer means connected to and controlling said data acquisition unit and having timing means, a memory and an output, and recording means connected to said output, said instrumentation assembly including:

first liquid level measuring means for measuring the level of liquid in said tank and for sending an analog signal thereof to said data acquisition means, first temperature sensing means attached to said first liquid level measuring means for monitoring its temperature thereof and for transmitting to said computer the value thereof, second liquid level measuring means contained in an evaporation level monitoring tube containing tank liquid, for measuring continuously the liquid level in the monitoring tube, at a height slightly above the liquid level in said tank, and for sending an analog signal thereof to said computer, second temperature sensing means attached to said second liquid level measuring means for monitoring its temperature and transmitting to said computer the value thereof, third temperature sensing means for measuring the ambient air temperature adjacent to said tank and transmitting the value thereof to said computer, and a plurality of temperature sensor and probe means for measuring the temperatures in the tank liquid at a plurality of locations, and for sending those temperatures to said computer, said computer having means for computing the tank leakage from the information provided by the elements recited above.

14. The apparatus of claim 13 including first pressure measuring means for measuring continuously the pressure of the liquid at a locus in said tank and for sending an analog signal thereof to said computer, fourth temperature sensing means attached to said pressure measuring means for measuring its temperature and transmitting to said computer the value thereof, and second pressure measuring means for continuously measuring atmospheric pressure adjacent said tank and for sending an analog signal thereof to said computer.

15. The apparatus of claim 14 including hydrometer means for measuring the specific gravity of the tank liquid for entry into said data acquisition means.

16. The apparatus of claim 14 including inclinometer means for measuring the inclination angle of the tank fill pipe and tank for entry into said data acquisition unit.

17. The apparatus of claim 14 including displacement calibrator means for determining the proportion of volumetric displacement of said liquid into said fill pipe relative to that into said other pipes connected to said tank.

18. The apparatus of claim 14 having a liquid circulation system for circulating liquid in said tank to assure that after said tank has been filled with liquid at a temperature different from that of the liquid already in the tank, the liquid can be circulated until the temperature of the liquid in the tank is substantially uniform.

19. Apparatus for detecting and measuring leaks from an underground tank having a fill pipe at an upper end thereof and having other pipes connected thereto, and containing a liquid that extends up into said fill pipe, comprising:

a test instrumentation assembly of test elements, conductor means attached to the elements of said test instrumentation assembly, data acquisition means connected to said conductor means, digital computer means connected to and controlling said data acquisition unit and having timing means, a memory and an output, and recording means connected to said output, said instrumentation assembly including:

first liquid level measuring means for measuring the level of liquid in said tank and for sending an analog signal thereof to said data acquisition means, first temperature sensing means attached to said first liquid level measuring means for monitoring its temperature thereof and for transmitting to said computer the value thereof, second liquid level measuring means contained in an evaporation level monitoring tube containing tank liquid, for measuring the liquid level in the monitoring tube, at a height slightly above the liquid level in said tank, second temperature sensing means for measuring the ambient air temperature adjacent to said tank and transmitting the value thereof to said computer, and a plurality of temperature sensors and a plurality of probe means for measuring the temperatures in the tank liquid at a plurality of locations, and for sending those temperatures to said computer, said computer having means for computing the tank leakage from the information provided by the elements recited above.

20. Apparatus for detecting and measuring leaks from an underground tank having a fill pipe at an upper end thereof and having other pipes connected thereto, and containing a liquid that extends up into said fill pipe, comprising:
  a test instrumentation assembly of test elements,
  conductor means attached to the elements of said test instrumentation assembly, and
  digital monitoring means for manual recovery of the data obtained by said assembly,
  said instrumentation assembly including:
  first liquid level measuring means for measuring the liquid level of liquid in said tank and for sending an analog signal thereof to said digital monitoring means,
  first temperature sensing means attached to said first liquid level measuring means for monitoring its temperature thereof and for transmitting to said digital monitoring means the value thereof,
  second liquid level measuring means contained in an evaporation level monitoring tube for containing tank liquid, for measuring continuously the liquid level in the monitoring tube, at a height slightly above the liquid level in said tank, and for sending an analog thereof to said digital monitoring means,
  second temperature sensing means attached to said second liquid level measuring means for monitoring its temperature and transmitting to said digital monitoring means the value thereof,
  third temperature sensing means for measuring the ambient air temperature adjacent to said tank and transmitting the value thereof to said digital monitoring means, and
  a plurality of temperature sensors and a plurality of probe means for measuring the temperatures in the tank liquid at a plurality of locations, and for sending those temperatures to said digital monitoring means.

21. The apparatus of claim 20 including first pressure measuring means for measuring continuously the pressure of the liquid and for sending an analog signal thereof to said digital monitoring means,
  fourth temperature sensing means attached to said pressure measuring means for measuring its temperature and transmitting to said digital monitoring means the value thereof, and
  second pressure measuring means for measuring atmospheric pressure adjacent said tank and for sending an analog signal thereof to said digital monitoring means.

22. The apparatus of claim 20 including hydrometer means for measuring the specific gravity of the tank liquid for entry into said data acquisition means.

23. The apparatus of claim 20 including inclinometer means for measuring the inclination angle of the tank fill pipe for entry into said data acquisition unit.

24. The apparatus of claim 20 including displacement calibrator means for determining the proportion of volumetric displacement of said liquid into said fill pipe relative to that into said other pipes connected to said tank.

25. Apparatus for detecting and measuring leaks from underground tanks having a fill pipe at an upper end thereof and having other pipes connected thereto, and containing a liquid that extends up into said fill pipe, comprising:
  a test instrumentation assembly of test elements,
  conductor means attached to the elements of said test instrumentation assembly,
  data acquisition means connected to said conductor means,
  digital computer means connected to and controlling said data acquisition unit and having timing means, a memory, and an output, and
  recording means connected to said output,
  said instrumentation assembly including:
  first liquid level measuring means for measuring the level of liquid in said tank and for sending an analog signal thereof to said data acquisition means,
  first temperature sensing means attached to said first liquid level measuring means for monitoring its temperature and for transmitting to said computer the value thereof,
  second light level measuring means contained in an evaporation level monitoring tube containing tank liquid, for measuring continuously the liquid level in the monitoring tube, at a height slightly above the liquid level in said tank, and for sending an analog signal thereof to said computer,
  second temperature sensing means attached to said second liquid level measuring means for monitoring its temperature and transmitting to said computer the value thereof,
  first pressure measuring means for measuring continuously the pressure of the liquid and for sending an analog signal thereof to said computer,
  third temperature sensing means attached to said pressure measuring means for measuring its temperature and transmitting to said computer the value thereof,
  second pressure measuring means for measuring atmospheric pressure adjacent said tank and for sending an analog signal thereof to said computer,
  fourth temperature sensing means for measuring the ambient air temperature adjacent to said tank and transmitting the value thereof to said computer, and
  a plurality of temperature sensor and probe means for measuring the temperatures in the tank liquid at a plurality of locations, and for sending those temperatures to said computer,
  said computer having means for computing the tank leakage from the information provided by the elements recited above.

26. The apparatus of claim 25 wherein said plurality of temperature sensors and a plurality of probe means are arrayed at a series of vertically spaced said locations in said tank.

27. The apparatus of claim 26 wherein said temperature sensors and a plurality of probe means comprises a cable havig weighting means at its lower end to assure extension thereof at its full length.

28. The apparatus of claim 25 having hydrometer means for measuring the specific gravity of the tank liquid for entry into said data acquisition means.

29. The apparatus of claim 25 having inclinometer means for measuring the inclination angle of the tank fill pipe for entry into said data acquisition unit.

30. The apparatus of claim 25 including displacement calibrator means for determining the proportion of volumetric displacement of said liquid into said fill pipe relative to that into said other pipes connected to said tank.

31. The apparatus of claim 25 including means for measuring the ground water level just outside said tank, and means for locating the liquid level at a given height above said ground water level.

32. The apparatus of claim 25 wherein said test instrument assembly comprises a cylindrical test pipe open at its ends enclosing said assembly, each of said named element of said assembly having an enclosure pipe of its own inside said test pipe, each said enclosure pipe being cylindrical and open at both ends.

33. Apparatus for detecting and measuring leaks from underground tanks having a fill pipe at an upper end thereof and having other pipes connected thereto, and containing a liquid that extends up into said fill pipe, comprising:

a test instrumentation assembly of test elements, a multiconductor electronic cable assembly with cables connected to the elements of said test instrumentation assembly, a computer-controlled data acquisition unit connected to said cable assembly, a digital computer connected to and controlling said data acquisition unit and having timing means, a memory, and an output, and recording means connected to said output, the elements of said instrumentation assembly including first linear variable displacement transducer and float means for measuring the level of liquid in said tank by vertical float movement, for converting the float movement to an electrical output voltage proportional to that movement and for sending said voltage through said cable assembly via said data acquisition unit to said computer, first temperature sensing means attached to said first linear variable displacement transducer and float means for monitoring the temperature thereof and for transmitting it through said cable assembly, evaporation level measurement means having an evaporation level monitoring tube, and second linear variable displacement transducer and float means for measuring continuously the liquid level in the monitoring tube, for converting the float movement thereof to an electrical output signal in volts, and for sending the voltage through the cable assembly via said data acquisition unit to said computer, second temperature sensing means attached to said second linear variable displacement transducer and float means for monitoring the temperature thereof and for transmitting it to said computer, and a plurality of temperature sensors and probe means for measuring the temperatures in the tank liquid at a plurality of vertically spaced locations, and for sending the temperatures to said computer, said computer having means for computing tank leakage from the information provided by the elements recited above.

34. The apparatus of claim 33 including first pressure transducer and probe means for measuring continuously the pressure exerted in said liquid and the pressure difference between two locations in said liquid, for converting the sensed pressure to an electrical output signal in volts, proportional to the measured pressure and pressure difference, and for sending the resulting voltage via said cable to said computer, and third temperature sensing means attached to said pressure transducer and probe means for measuring the temperature thereof and for sending that information to said computer, second pressure transducer means for measuring atmospheric pressure adjacent said tank, for converting the value thereof to voltage, and for sending that voltage to said computer, fourth temperature sensing means for measuring ambient air temperature adjacent to said tank and sending a value thereof to said computer.

35. The apparatus of claim 34 having hydrometer means for measuring the specific gravity of the tank liquid, and means for entering said specific gravity in said computer.

36. The apparatus of claim 34 having inclinometer means for measuring the inclination angle of the tank fill pipe, and means for entering the value of that angle in said computer.

37. The apparatus of claim 34 including displacement calibrator means contained in a displacement calibrator tube for determining the proportion of volumetric displacement of said liquid into said fill pipe relative to that in said other pipes connected to said tank.

38. The apparatus of claim 34 including means for measuring the ground water level just outside said tank and means for locating the liquid level at a given height above said ground water level.

39. Apparatus for detecting and measuring leaks from underground tanks having a fill pipe at an upper end thereof and having other pipes connected thereto, and containing a liquid that extends up into said fill pipe, comprising:

a test instrumentation assembly of test elements, a multiconductor electronic cable assembly connected to the elements of said test instrumentation assembly, a computer-controlled data acquisition unit connected to said cable assembly, a digital computer connected to and controlling said data acquisition unit and having timing means, a memory, and an output, recording means connected to said output, hydrometer means for measuring the specific gravity of the tank liquid, means for entering said specific gravity into said computer, and inclinometer means for measuring the inclination angle of the tank fill pipe, means for entering the value of that angle into said computer, the elements of said instrumentation assembly including first linear variable displacement transducer and float means for measuring the level of liquid in said tank by vertical float movement, for converting the float movement to an electrical output voltage proportional to that movement and for sending said voltage through said cable assembly via said data acquisition unit to said computer, first temperature sensing means attached to said first linear variable displacement transducer and float means for monitoring the temperature thereof and for transmitting it through said cable assembly, evaporation level measurement means having an evaporation level monitoring tube, and second linear variable displacement transducer and float means for measuring continuously the liquid level in the monitoring tube, for converting the float movement thereof to an electrical output signal in volts, and for sending the voltage through the cable assembly via said data acquisition unit to said computer, second temperature sensing means attached to said second linear variable displacement transducer and float means for monitoring the temperature thereof and for transmitting it to said computer, first pressure transducer and probe means for measuring continuously the pressure exerted in said liquid and the pressure difference between two locations in said liquid, for converting the sensed pressure to an electrical output signal in volts, proportional to the measured pressure and pressure difference, and for sending the resulting voltage via said cable to said computer, third temperature sensing means attached to said pressure transducer and probe means for measuring the temperature thereof and for sending that information to said computer, second pressure transducer means for measuring atmospheric pressure adjacent said tank, for converting the value thereof to voltage, and for sending that voltage to said computer, third temperature sensing means for measuring ambient air temperature adjacent to said tank and sending a value thereof to said computer, a plurality of temperature sensor and probe means for measuring the temperatures in the tank liquid at a plurality of locations, and for sending the temperatures to said computer, displacement calibrator means contained in a displacement calibrator tube for determining the proportion of volumetric displacement of said liquid into said fill pipe relative to that in said other pipes connected to said tank, means for measuring the ground water level just outside said tank, and means for locating the liquid level at a given height above said ground water level, said computer having means for computing tank leakage from the information provided by the elements recited above.

40. Apparatus for detecting and measuring leaks from underground tanks having a fill pipe at an upper end thereof and having other pipes connected thereto, and containing a liquid that extends up into said fill pipe, comprising:

a test pipe, a test instrumentation assembly of elements contained in said test pipe, a multiconductor electronic cable assembly with cables connected to the elements of said test instrumentation assembly, a computer-controlled data acquisition unit connected to said cable assembly, a digital computer connected to and controlling said data acquisition unit and having timing means, a memory, and an output, an integral plotter and a printer connected to said output, hydrometer means for measuring the specific gravity of the tank liquid and for passing the measured value to said data acquisition unit, and inclinometer means for measuring the inclination angle of the tank fill pipe and for passing the value of that angle to said data acquisition unit, said instrumentation assembly including:

(a) first linear variable displacement transducer and float means connected to said cable assembly for measuring the level of liquid in said tank by vertical float movement, for converting the float movement to an electrical output voltage proportional to the vertical float movement, and for sending said voltage through said cable assembly to said data acquisition unit and said computer, wherein changes in liquid level are measured to an accuracy of at least 0.00001 inch, (b) first temperature sensing means attached to said first linear variable displacement transducer and float means and connected to said cable assembly, for monitoring the temperature thereof and for transmitting to said computer the value thereof, (c) an evaporation level monitoring tube adjacent to said fill pipe and above the liquid level in said tank, (d) second linear variable displacement transducer and float means for evaporation level measurement, contained in said evaporation level monitoring tube and connected to said cable assembly, for measuring continuously the liquid level in the monitoring tube, for converting the float movement thereof to an electrical output signal in volts and sending the voltage through the cable assembly to said data acquisition unit and said computer, wherein said evaporation liquid level changes are measured to an accuracy at least 0.00001 inch, (e) second temperature sensing means, attached to said second linear variable displacement transducer and float means and connected to said cable assembly, for monitoring the temperature thereof and for transmitting it via said cable assembly to said computer, (f) first pressure transducer and probe means connected to said cable assembly, for measuring continuously the pressure of the liquid, said pressure transducer and probe means having a sensing face located above the liquid and connected to a hollow pressure monitoring tube, the bottom end of which is placed at a fixed location in the liquid, said first pressure transducer and probe means measuring the pressure difference between said bottom end of said hollow tube and said sensing face, for converting the sensed pressure values to an electrical output signal in volts, proportional to said pressure values, and for sending the resulting voltage via said cable and said data acquisition unit to said computer, (g) third temperature sensing means attached to said pressure transducer and probe means and to said cable assembly for measuring the temperature thereof and for sending the temperature via said cable assembly to said computer, (h) second pressure transducer means attached to said cable assembly for measuring atmospheric pressure adjacent said tank, for converting the value thereof to voltage, and for sending that voltage to said computer via said cable assembly, both said first pressure transducer and probe means and said second pressure transducer measuring pressures to within 0.0001 p.s.i., (i) third temperature sensing means attached to said cable assembly, for measuring ambient air temperature adjacent to said tank and sending a value thereof to said computer, via said cable means, (j) a plurality of temperature sensors and a plurality of probe means connected to said cable assembly, for measuring the temperatures in the tank liquid at a plurality of locations for sending those temperatures to said computer, wherein all of said temperature sensing means and said temperature sensor and probe means measure to an accuracy of 0.001° F., and (k) a displacement calibrator tube containing displacement calibrator means for determining the proportion of volumetric displacement of said liquid into said fill pipe relative to that in said other pipes connected to said tank, said computer having means for computing tank leakage from the information provided by the elements recited above.

41. A test instrumentation assembly of test elements, for detecting leaks from underground tanks having a fill pipe at an upper end thereof and and containing a liquid that extends up into said fill pipe, comprising a test pipe comprising a cylinder open at both ends, for fitting in said fill pipe and containing each of the following elements:

first linear variable displacement transducer and float means for measuring the level of liquid in said tank by vertical float movement and for converting the float movement to an electrical output voltage proportional to that movement, first temperature sensing means attached to said first linear variable displacement transducer and float means for monitoring the temperature thereof and for producing an electrical output voltage proportional thereto, evaporation level measurement means contained in an evaporation level monitoring tube, second linear variable displacement transducer and float means for measuring continuously the liquid level in the monitoring tube and for converting the float movement thereof to an electrical output voltage, second temperature sensing means attached to said second linear variable displacement transducer and float means for monitoring the temperature thereof and for producing an electrical output voltage therefrom, and a plurality of temperature sensors and a plurality of probe means extending down through the lower end of said test pipe for measuring the temperatures in the tank liquid at a plurality of vertically spaced locations, and for producing an electrical output voltage therefrom.

42. The apparatus of claim 42 having first pressure transducer and probe means for measuring continuously the pressure exerted in said liquid and for converting the sensed pressure to an electrical output signal voltage, proportional to the measured pressure and pressure difference, third temperature sensing means attached to said pressure transducer and probe means for measuring the temperature thereof and for producing an electrical voltage therefrom, second pressure transducer means for measuring atmospheric pressure adjacent said tank and for converting the value thereof to voltage, and fourth temperature sensing means for measuring ambient air temperature adjacent to said tank and producing an electrical output voltage therefrom.

43. The apparatus of claim 41 having hydrometer means for measuring the specific gravity of said liquid.

44. The apparatus of claim 41 having inclinometer means for measuring the inclination of said fill pipe and the tank.

45. The apparatus of claim 41 wherein said tank has additional piping and displacement calibration means for determining the proportion of volumetric displacement into said fill pipe relative to that into said additional piping.

46. Apparatus for use in detecting leaks from underground tanks having a fill pipe at an upper end thereof and containing a liquid that extends up into said fill pipe, comprising:

a cylindrical test pipe open at an upper end and at a lower end and fitting in said fill pipe, a test instrumentation assembly of elements contained in said test pipe and comprising (a) first linear variable displacement transducer and float means for measuring the level of liquid in said tank to an accuracy of at least 0.1 inch, by vertical float movement and for converting the float movement to an electrical output voltage proportional to the vertical float movement, (b) first temperature sensing means attached to said first linear variable displacement transducer and float means for monitoring the temperature thereof and for converting that temperature to an electrical output voltage, (c) an evaporation level monitoring tube adjacent to said fill pipe and above the liquid level in said tank, (d) second linear variable displacement transducer and float means for evaporation level measurement, contained in said evaporation level monitoring tube for measuring continuously the liquid level in the monitoring tube to an accuracy at least 0.1 inch, and for converting the float movement thereof to an electrical output signal in volts, (e) second temperature sensing means, attached to said second linear variable displacement transducer and float means for monitoring the temperature thereof and for converting the temperature to electrical output voltage, and (f) a plurality of temperature, sensors and a plurality of probe means for measuring the temperatures in the tank liquid at a plurality of vertically spaced locations and for converting those temperatures to voltage outputs, all of said temperature sensing means and said temperature sensors and probe means measuring to an accuracy of 0.005° F.

47. The apparatus of claim 46 having, in addition (g) first pressure transducer and probe means for measuring continuously the pressure of the liquid, said pressure transducer and probe means having a sensing face located above the liquid and connected to a hollow pressure monitoring tube, the bottom end of which is placed at a fixed location in the liquid, said first pressure transducer and probe means measuring the pressure difference between said bottom end of said hollow tube and said sensing face and for converting the sensed pressure values to an electrical voltage output, (h) third temperature sensing means attached to said pressure transducer and probe means and to said cable assembly for measuring the temperature thereof and for converting it to an electrical voltage output, (i) second pressure transducer means for measuring atmospheric pressure adjacent said tank and for converting the value thereof to voltage, both said pressure transducer and probe means measuring pressures to within 0.002 p.s.i., and (j) fourth temperature sensing means for measuring ambient air temperature adjacent to said tank and converting that temperature to an output voltage.

48. The apparatus of claim 46 wherein the accuracy of said first and second linear variable displacement transducer is to at least 0.00001 inch, the accuracy of said pressure transducer means is to at least 0.00005 p.s.i., and the accuracy of said temperature sensing means and sensors is to at least 0.0001° F.

49. The apparatus of claim 46 having hydrometer means for measuring the specific gravity of said liquid.

50. The apparatus of claim 46 having inclinometer means for measuring the inclination of said fill pipe.

51. The apparatus of claim 46 wherein said tank has additional piping and displacement calibration means for determining the proportion of volumetric displacement into said fill pipe relative to that into said additional piping.

52. The apparatus of claim 46 wherein each of said assembly elements includes and is at least partially contained in a rigid tube.

53. A method for obtaining the rate of leakage from an underground tank having a known liquid therein at a predetermined starting level, comprising:

calculating a reference volume of the tank from the dimensions of the tank, measuring the average temperature of the liquid in the tank, obtaining a temperature correction factor from said average temperature and the temperature coefficient of expansion of said liquid, measuring the linear displacement of the liquid level with respect to time, over a predetermined time interval, and calculating the tank leakage rate from said reference volume, said linear displacement, said time interval, and said temperature factor.

54. The method of claim 53 wherein said tank has piping connected thereto including the steps of:

displacing a known volume of the liquid in the tank and piping, measuring the resulting displacment of the liquid level, and including said resulting displacment in said step of calculating said leakage rate.

55. The method of claim 53 wherein said step of measuring said average temperature comprises:

measuring the temperature at a series of vertically spaced loci, to ascertain the temperature of each of a series of segments of the tank volume, weighting the temperatures with the relative size of said segments, and calculating said average from the weighted temperature values.

56. The method of claim 53 wherein said tank has a plurality of pipes connected thereto, comprising measuring the temperature of the liquid in each said pipe, determining the volume of each said pipe from the length and cross-sectional area thereof, weighting the measured temperatures according to said pipe volumes, weighting said average tank temperature according to the relative volumes of the tank and of the pipe, and averaging said weighted temperatures to produce the step of measuring the average temperature employed in the calculating step for tank leakage rate.

57. The method of claim 53 including the steps of obtaining the amount of evaporation of the liquid in said tank over said predetermined time interval, and including that amount in said step of calculating said tank leakage rate.

58. The method of claim 53 including the steps of measuring the atmospheric pressure adjacent to said tank and including that pressure in said step of calculating the tank leakage rate.

59. The method of claim 53 in a tank having a fill pipe including the steps of measuring the inclination of said fill pipe and said tank, and including said inclination in said step of calculating said tank leakage rate.

60. The method of claim 53, comprising measuring the height of groundwater outside the tank, relative to the bottom of said tank, and including that measurement in the step of calculating the tank leakage rate.

61. The method of claim 60 comprising the steps of calculating the amount of water inside said tank, calculating the coefficient of expansion thereof as compared with that of the major liquid, and compensating for the difference.

62. The method of claim 53, comprising determining the specific gravity of the tank liquid and using that specific gravity, in combination with the known characteristics of the particular type of liquid, in the step of obtaining the temperature coefficient of expansion.

63. The methed of claim 53 including, measuring the temperature of said tank and incorporating that temperature and the temperature coefficient of expansion of the material from which the tank is made in the step of calculating said tank leakage rate.

64. The method of claim 63 including the steps of determining the amount of ground water in said tank and the amount of major liquid stored in the tank, and compensating for the different coefficients of expansion of water and of said liquid.

65. A method for obtaining the rate of leakage from an underground tank having a known liquid therein at a predetermined starting level, comprising:

calculating a reference volume of the tank from the dimensions of the tank, measuring the average temperature of the liquid in the tank, obtaining a temperature correction factor from said average temperature and the temperature coefficient of expansion of said liquid, measuring the pressure change of the tank liquid at a fixed location in the tank over a predetermined time interval, and calculating the tank leakage rate from said reference volume, said pressure change, said time interval, and said temperature factor.

66. The method of claim 65 wherein the steps are performed on a continuous basis.

67. The method of claim 65 wherein said tank has piping connected thereto including the steps of:
displacing a known volume of the liquid in the tank and piping,
measuring the resulting displacement of the liquid level, and
including said resulting displacement in said step of calculating said leakage rate.

68. The method of claim 65 wherein said step of measuring said average temperature comprises:
measuring the temperature at a series of vertically spaced loci, to ascertain the temperature of each of a series of segments of the tank volume,
weighting the temperatures with the relative size of said segments, and
calculating said average from the weighted temperature values.

69. The method of claim 65 wherein said tank has a plurality of pipes connected thereto, comprising
measuring the temperature of the liquid in each said pipe,
determining the volume of each said pipe from the length and cross-sectional area thereof,
weighting the measured temperatures according to said pipe volumes,
weighting said average tank temperature according to the relative volumes of the tank and of the pipe, and
averaging said weighted temperatures to produce the average temperature employed in the calculating step for tank leakage rate.

70. The method of claim 65 including the steps of
obtaining the amount of evaporation of the liquid in said tank over said predetermined time interval, and
including that amount in said step of calculating said tank leakage rate.

71. The method of claim 65 including the steps of
measuring the atmospheric pressure adjacent to said tank and
including that pressure in said step of calculating the tank leakage rate.

72. The method of claim 65 in a tank having a fill pipe including the steps of
measuring the inclination of said fill pipe and said tank, and
including said inclination in said step of calculating said tank leakage rate.

73. The method of claim 65, comprising
measuring the height of groundwater outside the tank, relative to the bottom of said tank, and
including that measurement in the step of calculating the tank leakage rate.

74. The method of claim 65, comprising
determining the specific gravity of the tank liquid and using that specific gravity, in combination with the known characteristics of the particular type of liquid in the step of obtaining the temperature coefficient of expansion.

75. The method of claim 65 including,
measuring the temperature of said tank and
incorporating that temperature and the temperature coefficient of expansion of the material from which the tank is made in the step of calculating said tank leakage rate.

76. A method for obtaining the rate of leakage from an underground tank having a known liquid therein at a predetermined starting level, comprising:
calculating a reference volume of the tank and from the dimensions of the tank,
measuring the average temperature of the liquid in the tank,
obtaining a temperature correction factor from said average temperature and the temperature coefficient of expansion of said liquid,
measuring the linear displacement of the liquid level with time over a predetermined time interval,
measuring the pressure change of the tank liquid at a fixed location in the tank over said predetermined time interval, and
calculating the tank leakage rate from said reference volume, said linear displacement, said pressure change, said time interval, and said temperature factor.

77. The method of claim 76 wherein before the step of measuring the average temperature of the liquid in the step there is a step of circulating said liquid until said temperature is substantially uniform.

78. The method of claim 76 comprising performing said step of calculating the tank leakage with a digital computer.

79. The method of claim 76 comprising collecting the data from each of said measuring steps and transmitting those data to said computer via an analog-to-digital data acquisition unit.

80. The method of claim 76 wherein instruments are used in said measuring step and including the steps of simultaneously measuring the temperature of each said instrument and the temperatures of the tank itself.

81. The method of claim 80 including the steps of measuring the atmospheric pressure adjacent to the tank by an instrument and measuring the temperature of that instrument.

82. The method of claim 76 wherein said tank has pipes connected thereto, including the steps of
displacing a known volume of liquid in said tank and said pipes,
measuring the resulting displacement of the liquid level in said tank,
measuring the temperatures of the liquid in said pipes,
determining the volume of each said pipe,
weighting the measured temperatures according to said pipe volumes,
weighting the average tank temperatures according to the relative volumes of the tank and the pipes,
averaging said weighted temperatures to produce the average temperature employed in the step of calculating the tank leakage rate, and
including said resulting displacement in said step of calculating the tank leakage rate.

83. The method of claim 76 including the steps of
obtaining the amount of evaporation of the liquid in said tank over said predetermined time interval, and
including that amount in said step of calculating said tank leakage rate.

84. The method of claim 76 in a tank having a fill pipe including the steps of
measuring the inclination of said fill pipe and
including said inclination in said step of calculating said tank leakage rate.

85. The method of claim 76, comprising
determining the specific gravity of the tank liquid and using that specific gravity, in combination with the known characteristics of the particular type of liquid, in the step of obtaining the temperature coefficient of expansion.

86. The method of claim 76, comprising
measuring the height of groundwater outside the tank, relative to the bottom of said tank, and
including that measuring in the step of calculating the tank leakage rate.

87. A method for obtaining the rate of leakage from an underground tank having piping and a known liquid therein at a predetermined starting level, employing a digital computer having a timer, a memory, and an output, comprising:
computing with said computer a reference volume of the tank from the dimensions of the tank,
measuring by an array of thermistors the temperatures of the liquid in the tank at a series of vertical strata of known dimensions,
obtaining a temperature correction factor from said array temperatures and the temperature coefficient of expansion of said liquid,
measuring the linear displacement of the liquid level with time over a predetermined time interval by an LVDT (linear variable displacement transducer),
measuring the temperature of said LVDT,
measuring the pressure change of the tank liquid at a fixed location in the tank over said time interval by a first pressure transducer above the liquid level in said tank and a probe connected to said transducer and extending into said tank,
measuring the atmospheric pressure above said first pressure transducer by a second pressure transducer,
measuring the temperatures of said first and second transducers, and
computing the tank leakage from said reference volume, said time interval, and said temperature factor, and the measurements obtained by said measuring steps.

88. The method of claim 87 including the steps of
placing some of the tank liquid in a vessel open to the atmosphere,
measuring by a second LVDT the evaporation rate of said vessel-contained liquid over said predetermined time interval,
including said evaporation rate in said step of computing said tank leakage rate,
measuring the temperature of said second LVDT, and
including that temperature in said step of computing said tank leakage rate.

89. The method of claim 87 wherein errors due to vapor pockets in said tank liquid are compensated for by continually monitoring said tank liquid pressure and temperatures, and continuing said monitoring until said errors are reduced to an insignificant amount.

90. The method of claim 87 wherein the measuring steps are continuous and are monitored to note evening out of the results and elimination of anomalies.

91. The method of claim 87 wherein the differences between the computed tank volume and the actual volume is found by
assuming a nominal worst-case error in volume,
computing a corresponding worst-case error in the leakage rate,
obtaining the difference between the computed leakage rate and the worst-case error leakage rate, and
continually monitoring the temperature data until the temperature change results in an insignificant difference between the leakage rates.

92. The method of claim 87, comprising
at one stage, purposely dropping the liquid level below the connections of the tank to its piping, determining by the LVDT, and temperature sensors the leakage rate from the tank only.

* * * * *

UNITED STATES PATENT AND TRADEMARK OFFICE
CERTIFICATE OF CORRECTION

PATENT NO. : 4,852,054
DATED : July 25, 1989
INVENTOR(S) : JOHN R. MASTANDREA

It is certified that error appears in the above-identified patent and that said Letters Patent is hereby corrected as shown below:

Column 4, line 12: "demands" should read --depends--

Column 7, line 33: "area" should read --areas--

Column 9, line 63: "temperature" should read --temperatures--

Column 13, line 11: "devide" should read --device--

Column 21, line 18: "CRP" should read --crp--

Column 21, line 25: "correctiona" should read --correction--

Column 24, line 38: --(1)-- should be inserted flush right of the equation "Vt(tank and piping)=(Va-Vc)/t"

Signed and Sealed this

Seventeenth Day of July, 1990

Attest:

HARRY F. MANBECK, JR.

*Attesting Officer*    Commissioner of Patents and Trademarks